US012709869B2

(12) United States Patent
Nakamura

(10) Patent No.: US 12,709,869 B2
(45) Date of Patent: Aug. 18, 2026

(54) DRIVING APPARATUS, DRIVING METHOD, AND DRIVING PROGRAM

(71) Applicant: NABTESCO CORPORATION, Tokyo (JP)

(72) Inventor: Kazuhito Nakamura, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/647,250

(22) Filed: Apr. 26, 2024

(65) Prior Publication Data

US 2024/0271387 A1 Aug. 15, 2024

Related U.S. Application Data

(63) Continuation of application No. PCT/JP2022/036268, filed on Sep. 8, 2022.

(30) Foreign Application Priority Data

Oct. 27, 2021 (JP) ................................ 2021-175810
Jan. 13, 2022 (JP) ................................ 2022-003480

(51) Int. Cl.
*E02F 9/20* (2006.01)
*B60L 15/32* (2006.01)
*E02F 3/38* (2006.01)

(52) U.S. Cl.
CPC .............. *E02F 9/207* (2013.01); *B60L 15/32* (2013.01); *E02F 3/38* (2013.01); *B60L 2200/40* (2013.01); *B60L 2210/40* (2013.01)

(58) Field of Classification Search
None
See application file for complete search history.

(56) References Cited

U.S. PATENT DOCUMENTS

2011/0093150 A1* 4/2011 Yanagisawa .............. B60L 1/02 180/65.225
2011/0318157 A1* 12/2011 Okamura ................ E02F 3/436 701/50

(Continued)

FOREIGN PATENT DOCUMENTS

CN 102341549 A 2/2012
CN 103222152 A 7/2013

(Continued)

OTHER PUBLICATIONS

International Search Report for International Application No. PCT/JP2022/036268; Date of Mailing, Dec. 6, 2022.

(Continued)

*Primary Examiner* — Daniel L Greene
(74) *Attorney, Agent, or Firm* — CANTOR COLBURN LLP

(57) ABSTRACT

A driving apparatus of an electric construction machine including a lower traveling body, an upper rotating body that is attached to the lower traveling body, a boom attached to the upper rotating body, an arm that is attached to the boom, and a bucket that is attached to the arm, includes: a battery that generates DC power, DC/AC converters that convert the DC power generated by the battery into AC power, a contactless transmission unit that contactlessly transmit the AC power converted by the DC/AC converters in joint components of the electric construction machine, and an actuator that drives the joint component based on the AC power transmitted from the contactless transmission unit.

10 Claims, 13 Drawing Sheets

(56) References Cited

U.S. PATENT DOCUMENTS

2013/0234507 A1* 9/2013 Kim .................... H02J 50/10
307/9.1
2017/0098965 A1 4/2017 Kikuchi et al.
2018/0152056 A1* 5/2018 Takahashi ............... H02P 27/06
2021/0237615 A1* 8/2021 Long ..................... B60W 10/26
2022/0294378 A1* 9/2022 Fukumura ............... H02M 7/48
2023/0131436 A1* 4/2023 Kitahara ................. E02F 9/207
60/420

FOREIGN PATENT DOCUMENTS

EP 2645533 A1 10/2013
JP 2004124381 A 4/2004
JP 2008088660 A 4/2008
WO 2020129525 A1 6/2020
WO 2020177565 A1 9/2020
WO 2021033489 A1 2/2021

OTHER PUBLICATIONS

JPO Notification of Reason(s) for Refusal for corresponding JP Application No. 2023-556226; Issued Apr. 16, 2024.
PCT International Preliminary Report on Patentability with Written Opinion of International Searching Authority for International Application No. PCT/JP2022/036268; Date of Mailing, Dec. 6, 2022.
EPO Extended European Search Report for corresponding EP Application No. 22886572.1; issued Aug. 12, 2025.
SIPO First Office Action for corresponding CN Application No. 202280072531.4; Issued Jun. 9, 2026.

* cited by examiner

FIG. 3

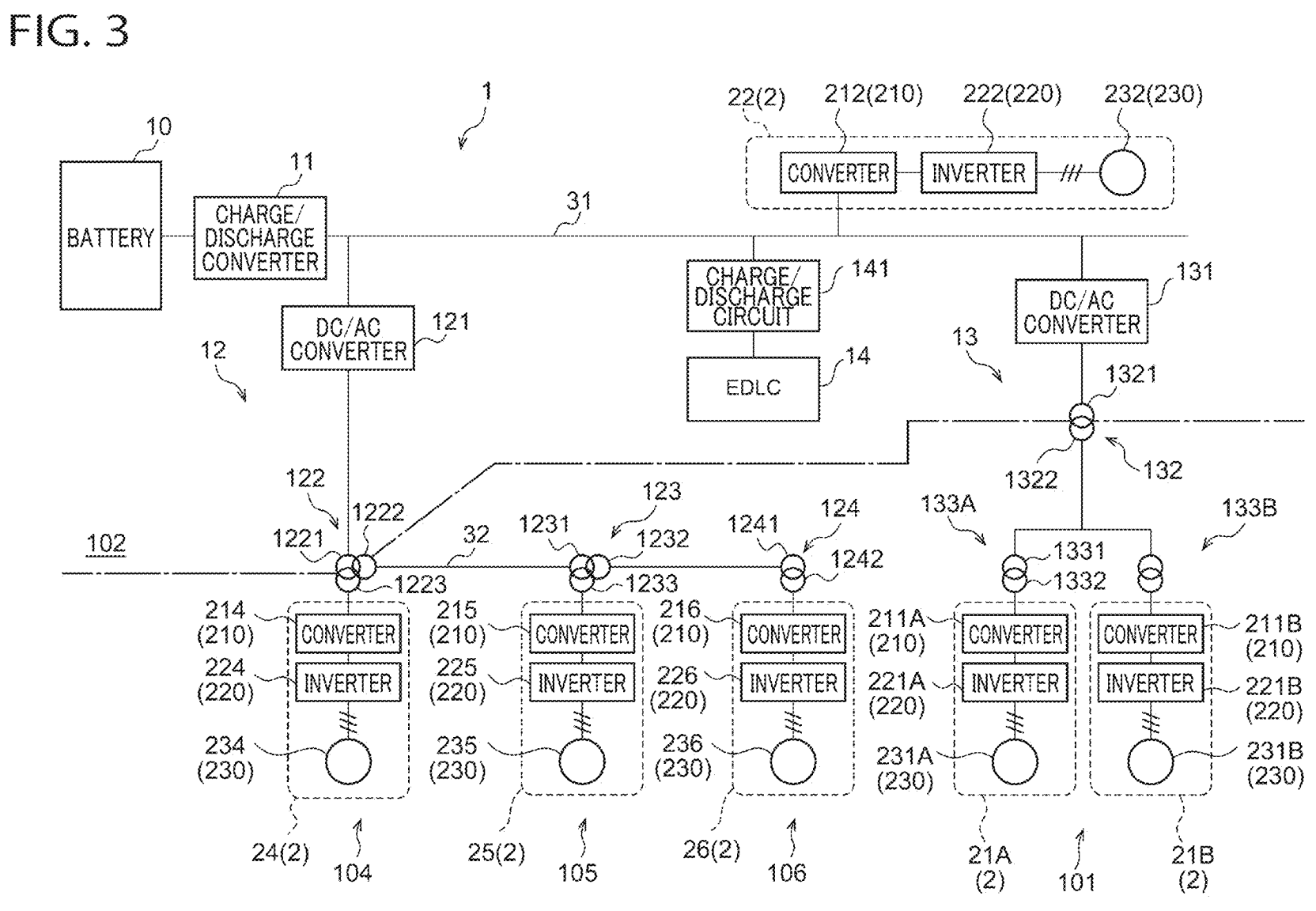

BATTERY
CHARGE/DISCHARGE CONVERTER
DC/AC CONVERTER
DC/AC CONVERTER
CHARGE/DISCHARGE CIRCUIT
EDLC
CONVERTER
INVERTER
1
10
11
12
121
122
1221
1222
1223
123
1231
1232
1233
124
1241
1242
13
131
132
1321
1322
133A
133B
1331
1332
14
141
31
32
101
102
104
105
106
21A (2)
21B (2)
22(2)
24(2)
25(2)
26(2)
211A (210)
211B (210)
212(210)
214 (210)
215 (210)
216 (210)
221A (220)
221B (220)
222(220)
224 (220)
225 (220)
226 (220)
231A (230)
231B (230)
232(230)
234 (230)
235 (230)
236 (230)

FIG. 5

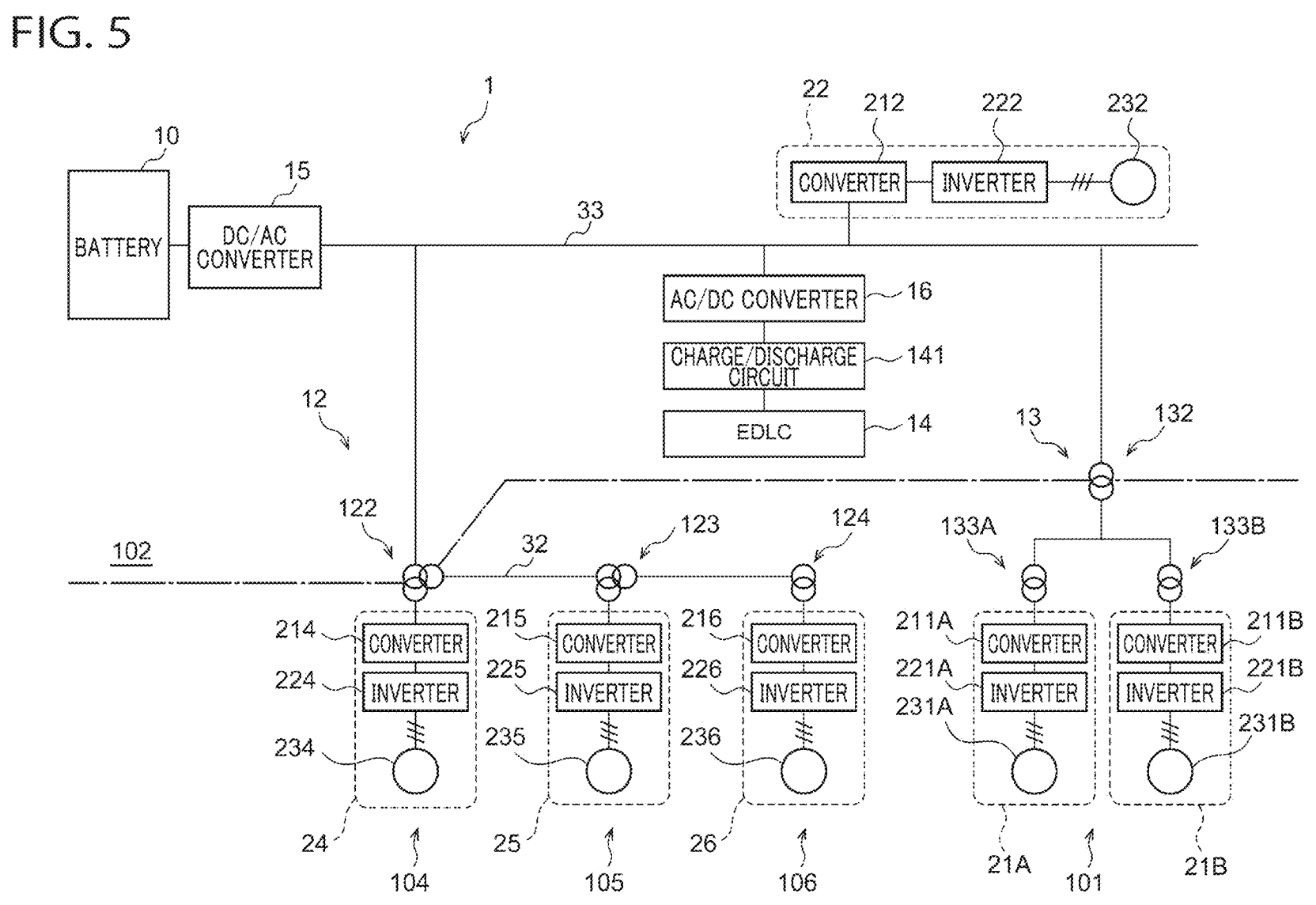

1
10 BATTERY
15 DC/AC CONVERTER
12
122
102
33
32
16 AC/DC CONVERTER
141 CHARGE/DISCHARGE CIRCUIT
14 EDLC
22
212 CONVERTER
222 INVERTER
232
13
132
133A
133B
123
124
24 104
214 CONVERTER
224 INVERTER
234
25 105
215 CONVERTER
225 INVERTER
235
26 106
216 CONVERTER
226 INVERTER
236
21A 101
211A CONVERTER
221A INVERTER
231A
21B
211B CONVERTER
221B INVERTER
231B

FIG. 6

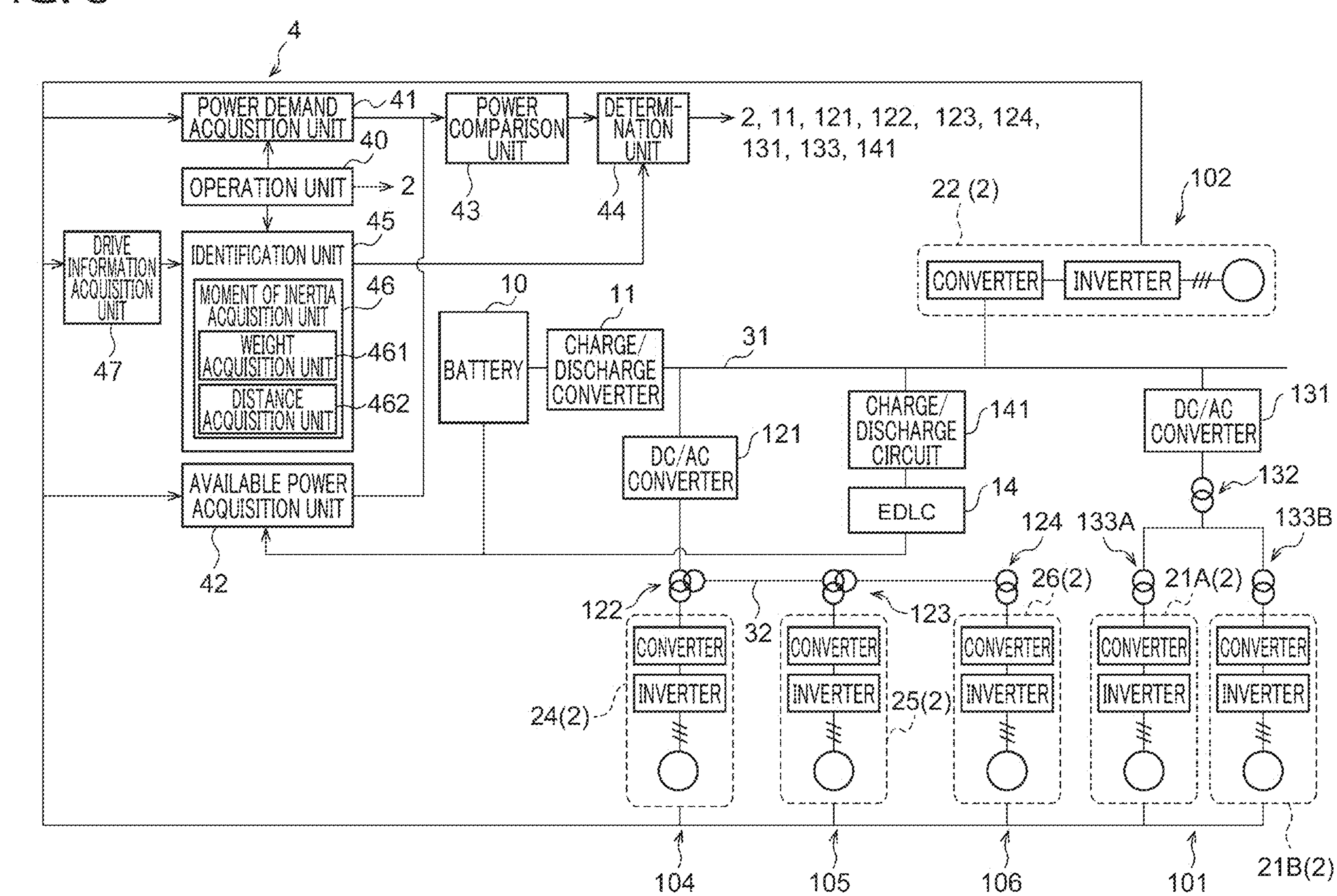
FIG. 8
4
POWER DEMAND ACQUISITION UNIT
41
OPERATION UNIT
40
2
IDENTIFICATION UNIT
45
MOMENT OF INERTIA ACQUISITION UNIT
46
WEIGHT ACQUISITION UNIT
461
DISTANCE ACQUISITION UNIT
462
AVAILABLE POWER ACQUISITION UNIT
42
DRIVE INFORMATION ACQUISITION UNIT
47
POWER COMPARISON UNIT
43
DETERMI-NATION UNIT
44
2, 11, 121, 122, 123, 124, 131, 133, 141
BATTERY
10
CHARGE/DISCHARGE CONVERTER
11
31
DC/AC CONVERTER
121
CHARGE/DISCHARGE CIRCUIT
141
EDLC
14
DC/AC CONVERTER
131
132
124
133A
133B
122
32
123
22 (2)
102
CONVERTER
INVERTER
24(2)
25(2)
26(2)
21A(2)
21B(2)
104
105
106
101

FIG. 13

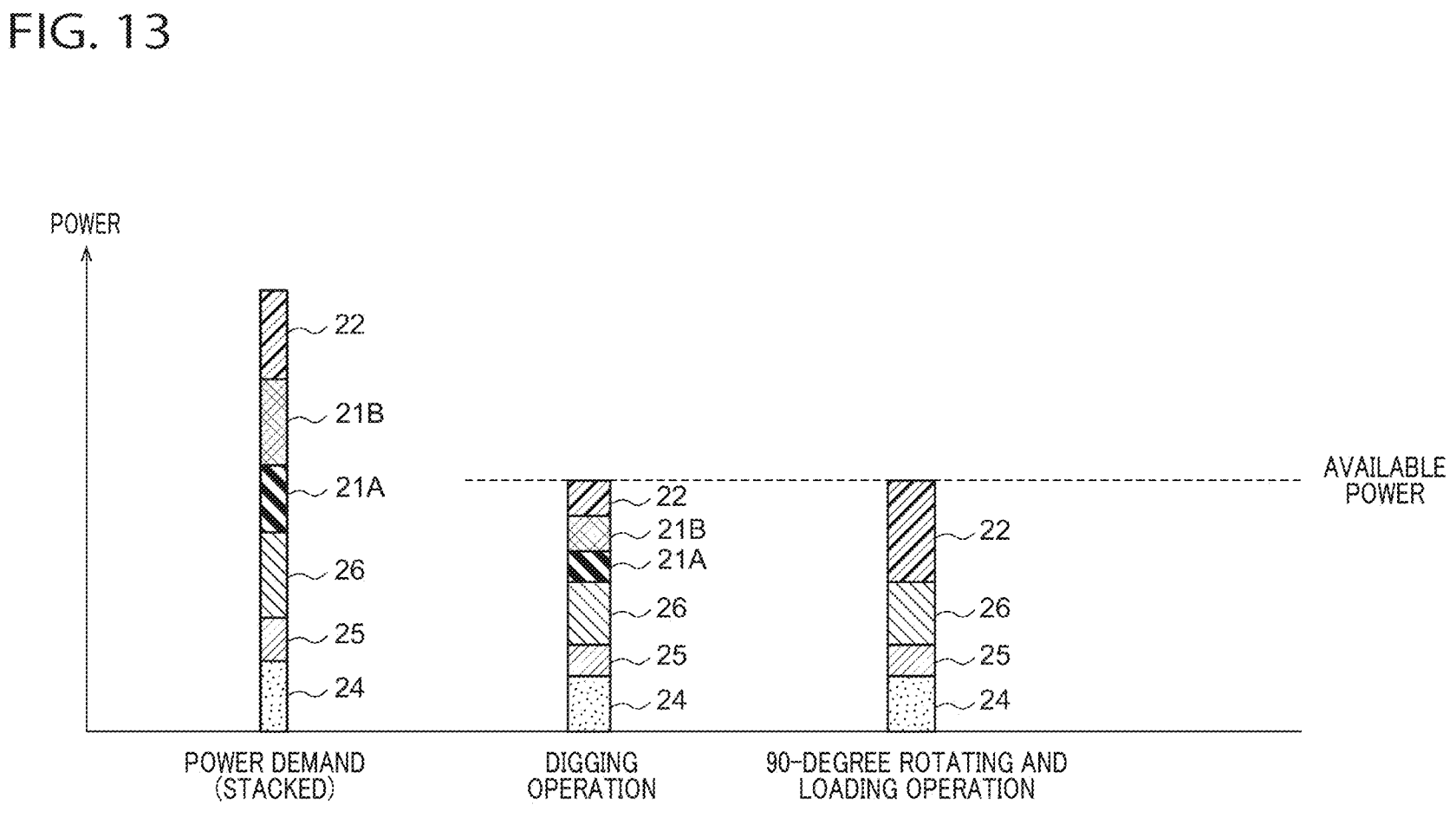

POWER

AVAILABLE POWER 22
21B
21A
26
25
24

POWER DEMAND (STACKED)

22
21B
21A
26
25
24

DIGGING OPERATION 22
26
25
24

90-DEGREE ROTATING AND LOADING OPERATION

DRIVING APPARATUS, DRIVING METHOD, AND DRIVING PROGRAM

CROSS REFERENCE TO RELATED APPLICATIONS

This application is a continuation under 35 U.S.C. § 120 of PCT/JP2022/036268, filed Sep. 28, 2022, which is incorporated herein by reference, and which claimed priority to Japanese Application No. 2021-175810, filed Oct. 27, 2021, and Japanese Application No. 2022-003480, filed Jan. 13, 2022. The present application likewise claims priority under 35 U.S.C. § 119 to Japanese Application No. 2021-175810, filed Oct. 27, 2021, and Japanese Application No. 2022-003480, filed Jan. 13, 2022, the entire content of which is also incorporated herein by reference.

BACKGROUND

1. Technical Field

The present invention relates to driving technology that uses electric power to drive a joint component of a machine.

2. Description of the Related Art

An electric construction machine driven by an electric motor (hereinafter also referred to as a motor) and a hybrid construction machine in which a hydraulic device and an electric motor are used together are known as construction machines used at construction sites (hereinafter also collectively referred to electric construction machines). An actuator that directly drives each joint component of an electric construction machine by a mechanical element such as a ball screw driven by the rotational power of a motor is called an electro-mechanical actuator (EMA). And an actuator that indirectly drives each joint component of an electric construction machine by a hydraulic device such as a hydraulic pump driven by the rotational power of a motor is called an electro-hydraulic actuator (EHA).

Patent Literature 1: Japanese Patent Application Publication No. 2008-88660

SUMMARY

In the electric construction machine of Patent Literature 1, DC power generated by a generator is transmitted to each joint component such as an upper rotating body through a wire. An actuator provided in each joint component is equipped with an inverter that converts DC power transmitted through the wire into AC power and a motor that rotationally drives each joint component based on the converted AC power. In case where the generator is provided in the upper rotating body, which is the main body of the electric construction machine, the wire that transmits the DC power to an actuator of a bucket, which is a joint component provided at the front end of the electric construction machine, is arranged across four joint components which are the upper rotating body, a boom, an arm, and the bucket. Such a long wire may not only prevent smooth operations of each of the joint components, but also make the enclosing structure more complicated or larger in order to prevent electrical leakage at each joint component or the like.

The present invention has been made in consideration of such a situation, and its purpose is to provide a driving apparatus that can supply power through a small contactless transmission unit without preventing smooth operation of a joint component of an electric machine.

In order to solve the above issue, a driving apparatus according to one embodiment of the present invention includes a conversion unit that converts power generated by a power source to AC power having a higher frequency; a contactless transmission unit that contactlessly transmits the converted AC power in a joint component of an electric machine; and a drive unit that drives the joint component based on the transmitted AC power. According to the present embodiment, the contactless transmission unit can contactlessly transmit AC power, without preventing smooth operation of the joint component of the electric machine.

Another embodiment of the present invention is a driving method. This method includes: a conversion step that converts power generated by a power source to AC power having a higher frequency; a contactless transmission step that contactlessly transmits the converted AC power in a joint component of an electric machine; and a drive step that drives the joint component based on the transmitted AC power.

It should be noted that any combination of the above components, or any conversion of the expression of the present invention among methods, devices, systems, storage media, computer programs and the like, are also valid as embodiments of the present invention.

According to the present invention, a driving apparatus can be provided that can supply power through a small contactless transmission unit without preventing smooth operation of a joint component of an electric machine.

BRIEF DESCRIPTION OF THE DRAWINGS

FIG. 3 shows a first configuration example of the driving apparatus of the electric construction machine;

FIG. 5 shows a second configuration example of the driving apparatus of the electric construction machine;

FIG. 6 shows a third configuration example of the driving apparatus of the electric construction machine;

FIG. 8 shows a configuration example of a power control device of the electric construction machine;

FIG. 13 shows an example of the power allocation to each actuator in accordance with work done by a working unit.

DETAILED DESCRIPTION

The technical concept of the driving apparatus described in the present embodiment can be applied to any electric machines equipped with a joint component. Although the present embodiment describes an example of a construction machine or electric construction machine equipped with a lower traveling body, an upper rotating body, a boom, an arm, and a bucket as joint components, this does not preclude the application of the technical concept of the driving apparatus according to the present embodiment to other electric machines. For example, the technical concept of the driving apparatus according to the present embodiment may be applied to an industrial robot equipped with a joint unit or a joint as a joint component. Besides, the technical concept of the driving apparatus and/or a power control device described in the present embodiment can be applied to any construction machines equipped with a lower traveling body, an upper rotating body, a boom, an arm, and a bucket as joint components. Besides, in the present embodiment, the EMA that directly drives each joint component of an electric construction machine by a mechanical element driven by the rotational power of a motor is exemplified as an actuator, but the technical concept of according to the present embodiment can also be applied to the EHA that indirectly drives each joint component of an electric construction machine by a hydraulic device driven by the rotational power of a motor.

Figure 1:
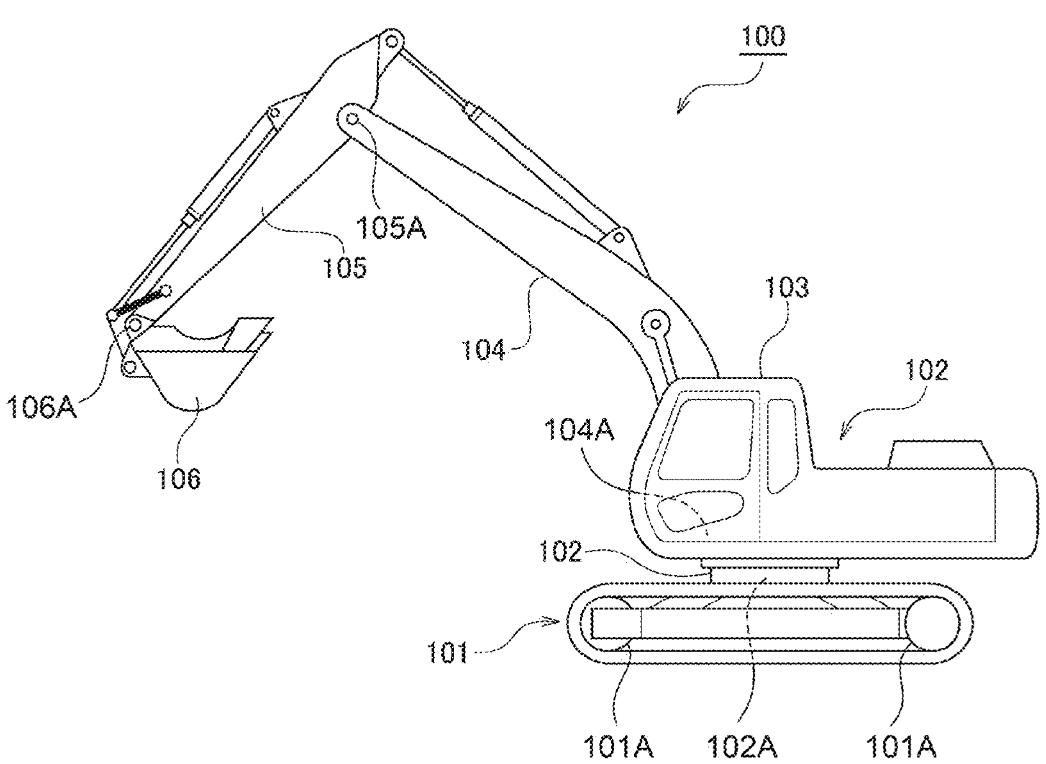
FIG. 1 is a schematic configuration diagram of an electric construction machine.
Figure 2:
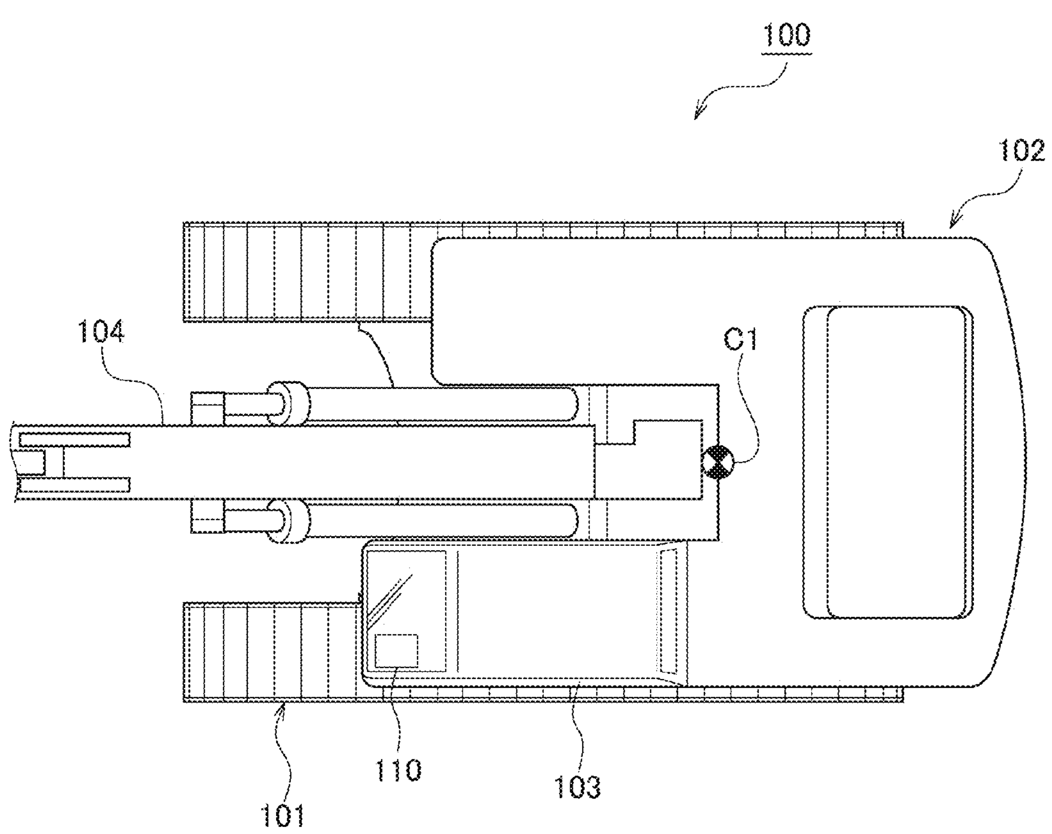
FIG. 2 is a top-view diagram of the electric construction machine.

FIG. 1 is a schematic configuration diagram of an electric construction machine 100. FIG. 2 is a top-view diagram of the electric construction machine 100. It should be noted that, in the below description, the directions such as forward (or front) and backward (or rear), upper and lower, left and right or the like, are the same as those of the electric construction machine 100. That is, in the below description, the forward proceeding direction of the electric construction machine 100 is simply called the forward direction, the backward receding direction of the electric construction machine 100 is simply called the backward direction, the upper side in the gravity direction is simply called the upper side, the lower side in the gravity direction is simply called the lower side, the right side in the width direction of the vehicle facing forward is simply called the right side, and the left side in the width direction of the vehicle facing forward is simply called the left side.

In the electric construction machine 100, which is a construction machine, an upper rotating body 102 is rotatably attached on a lower traveling body 101 that can travel forward and backward on the ground. The upper rotating body 102 includes a cab 103 on the front left side, and a boom 104 is attached in its front center, which can be raised and lowered. An arm 105 is attached to the front end of the boom 104, which can be bent up and down. A bucket 106 is attached to the front end of the arm 105, which can be bent up and down.

A gyro sensor 110 is attached on the front left side of the cab 103. In other words, the gyro sensor 110 is attached in the upper rotating body 102 at the maximum distance from the rotation center C1. The gyro sensor 110 is a sensor capable of detecting the tilt angle, the tilt direction, the rotational position, and the rotational angular speed of the cab 103 (or the lower traveling body 101 and the upper rotating body 102). It should be noted that the tilt direction refers to the upward direction or the downward direction of tilting.

The lower traveling body 101, the upper rotating body 102, the boom 104, the arm 105, and the bucket 106 are hereinafter collectively referred to as the joint component(s) of the electric construction machine 100. As such, the electric construction machine 100 shown in FIG. 1 and FIG. 2 is a construction machine with five joint components. It should be noted that the lower traveling body 101 constitutes a traveling unit that can travel on the ground, the upper rotating body 102 constitutes a rotating unit that can rotate with respect to the traveling unit, and the boom 104, the arm 105, and the bucket 106 constitute a working unit that are attached to the rotating unit to carry out work.

Strictly speaking, the joint components are the portions that rotate when the lower traveling body 101, the upper rotating body 102, the boom 104, the arm 105, and the bucket 106 are driven, and are indicated by 101A, 102A, 104A, 105A, and 106A, respectively, in FIG. 1. The joint component 101A of the lower traveling body 101 is front and rear wheels that form an endless track, the joint component 102A of the upper rotating body 102 is a rotating axis attached to the lower traveling body 101, the joint component 104A of the boom 104 is a bending axis attached to the upper rotating body 102, the joint component 105A of the arm 105 is a bending axis attached to the front end of the boom 104, and the joint component 106A of the bucket 106 is a bending axis attached to the front end of the arm 105. Hereinafter, the signs 101A, 102A, 104A, 105A, and 106A will not be used unless it is necessary to specify them, and the signs 101, 102, 104, 105, and 106 will be used instead. For example, the expressions of "lower traveling body 101" and/or "joint component 101" shall refer to the joint component 101A depending on the context.

FIG. 3 shows a first configuration example of a driving apparatus 1 of the electric construction machine 100. The driving apparatus 1 drives the lower traveling body 101, the upper rotating body 102, the boom 104, the arm 105, and the bucket 106, which are the joint components of the electric construction machine 100, based on DC voltage or DC power generated by a battery 10 as a DC power source. It should be noted that an AC power source that generates AC power may be provided instead of the battery 10 as the DC power source that generates DC power. Each joint component of the electric construction machine 100 is provided with an actuator as a drive unit to drive each of them. A pair of traveling body actuators 21A and 21B that drive the lower traveling body 101 for traveling, a rotating body actuator 22 that drives the upper rotating body 102 for rotating, a boom actuator 24 that drives the boom 104 for raising and lowering, an arm actuator 25 that drives the arm 105 for bending, and a bucket actuator 26 that drives the bucket 106 for bending, are hereinafter collectively referred to as actuator(s) 2.

Each actuator 2 is equipped with a converter, an inverter, and a motor. The pair of traveling body actuators 21A and 21B are equipped with converters 211A and 211B, inverters 221A and 221B, and motors 231A and 231B. The rotating body actuator 22 is equipped with a converter 212, an inverter 222, and a motor 232. The boom actuator 24 is equipped with a converter 214, an inverter 224, and a motor 234. The arm actuator 25 is equipped with a converter 215, an inverter 225, and a motor 235. The bucket actuator 26 is equipped with a converter 216, an inverter 226, and a motor 236. Hereinafter, the converters 211A, 211B, 212, 214, 215, and 216 are collectively referred to as converter(s) 210, the inverters 221A, 221B, 222, 224, 225, and 226 are collectively referred to as inverter(s) 220, and the motors 231A, 231B, 232, 234, 235, and 236 are collectively referred to as motor(s) 230.

As described below, AC power converted from DC power by the battery 10 is input to the converter 210, except for the converter 212 of the rotating body actuator 22 provided in the upper rotating body 102 together with battery 10. DC power from the battery 10 is input to the converter 212 of the rotating body actuator 22, without being converted by a DC/AC converter 121 or a DC/AC converter 131 described below. Each converter 210 converts the input AC power or DC power into DC power that can operate each inverter 220 at a later stage. The inverter 220 generates 3-phase AC power to rotationally drive the motor 230 at a later stage, based on the DC power input from the converter 210. The motor 230 generates rotational power to drive the corresponding joint component, based on the 3-phase AC power input from the inverter 220.

The battery 10 is connected to a DC voltage bus 31 via a charge/discharge converter 11. The charge/discharge converter 11 is a bidirectional DC/DC converter and is responsible for controlling the charge/discharge of the battery 10 and converting DC voltage. When discharging the battery 10, the DC voltage by discharging the battery 10 is converted by the charge/discharge converter 11 into prescribed DC voltage at the DC voltage bus 31. When charging the battery 10, the prescribed DC voltage at the DC voltage bus 31 is converted by the charge/discharge converter 11 into DC voltage that can charge the battery 10. The prescribed DC voltage at the DC voltage bus 31 can be freely set, but it is preferable to set it to high voltage of approximately 200 V to 400 V, for example.

Among the above components, the battery 10, the charge/discharge converter 11, the DC voltage bus 31, and the rotating body actuator 22 are provided in the upper rotating body 102, which is the main body of the electric construction machine 100 (the components above the single-dotted line in FIG. 3 are contained in the upper rotating body 102). Power for rotationally driving the upper rotating body 102 is supplied from the DC voltage bus 31, since the above described rotating body actuator 22 is connected to the DC voltage bus 31. Besides, a working unit power supply mechanism 12, which supplies power to the working unit configured by the boom 104, the arm 105, and the bucket 106, and a traveling body power supply mechanism 13, which supplies power to the lower traveling body 101 are provided, as branching off from the DC voltage bus 31.

The working unit power supply mechanism 12 is equipped with a DC/AC converter 121, a boom transmission unit 122, an arm transmission unit 123, and a bucket transmission unit 124. The DC/AC converter 121 constitutes a (DC/AC) conversion unit that converts DC power generated by the battery 10 into AC power. Specifically, the DC/AC converter 121, which is connected to the DC voltage bus 31 in the upper rotating body 102, converts the DC voltage supplied from the DC voltage bus 31 into AC voltage with a frequency of 1 kHz or higher. The frequency of AC power from a commercial power source is generally less than 100 Hz, but such a low frequency would increase the size of the coil that makes up the contactless transmission unit described below. Therefore, the present embodiment adopts a frequency of 1 kHz or higher, which is higher than the commercial power source, thereby downsizing the coil to compactly form the contactless transmission unit in each joint component of the electric construction machine 100 with limited space. It should be noted that in case an AC power source that generates AC power is provided instead of the battery 10 that generates DC power, an AC/AC converter that converts the AC power (e.g., less than 100 Hz) generated by the AC power source into AC power having a higher frequency (e.g., 1 kHz or higher) is provided as a conversion unit instead of the DC/AC converter 121.

The boom transmission unit 122, the arm transmission unit 123, and the bucket transmission unit 124 constitute contactless transmission units that contactlessly transmits the AC power converted by the DC/AC converter 121, in the boom 104, the arm 105, and the bucket 106, which are joint components of the electric construction machine 100. Specifically, the boom transmission unit 122 contactlessly transmits power to the boom actuator 24 and the arm transmission unit 123, the arm transmission unit 123 contactlessly transmits power to the arm actuator 25 and the bucket transmission unit 124, and the bucket transmission unit 124 contactlessly transmits power to the bucket actuator 26. The boom transmission unit 122, the arm transmission unit 123, and the bucket transmission unit 124 are connected in series by an AC voltage bus 32 that transmits AC power supplied from the DC/AC converter 121. As such, it is not necessary to provide the separate DC/AC converters 121 for each transmission unit, by connecting the boom transmission unit 122, the arm transmission unit 123, and the bucket transmission unit 124 in series, thereby simplifying the configuration of the driving apparatus 1.

The boom transmission unit 122 is configured by a plurality of coils stored inside a connecting part such as a swivel that connects the boom 104 and the upper rotating body 102 while allowing relative rotation around a horizontal rotating axis (104A in FIG. 1). Specifically, the boom transmission unit 122 is configured by a primary coil 1221 connected to the DC/AC converter 121 on the upper rotating body 102 side, a secondary coil 1222 connected to the AC voltage bus 32 on the arm 105 side, and a tertiary coil 1223 connected to the boom actuator 24. It should be noted that all or some of the coils of the boom transmission unit 122 and the DC/AC converter 121 at an earlier stage and/or the converter 214 (and even the inverter 224) at a later stage may be configured as an integrated transformer unit or a contactless transmission unit.

The primary coil 1221, the secondary coil 1222, and the tertiary coil 1223 are magnetically coupled to each other. The AC power supplied from the DC/AC converter 121 to the primary coil 1221 is contactlessly transmitted to the arm 105 side and/or to the boom actuator 24, by the secondary coil 1222 and/or the tertiary coil 1223 magnetically coupled to the primary coil 1221. As such, the boom actuator 24 as the drive unit of the boom 104 drives the boom 104 based on the AC power contactlessly transmitted by the primary coil 1221 and the tertiary coil 1223 in the boom transmission unit 122 as the contactless transmission unit. It should be noted that a magnetic material or the like may be inserted into the gap between the primary coil 1221, the secondary coil 1222, and the tertiary coil 1223 to increase power transmission efficiency.

Besides, the regenerative power generated during deceleration of the motor 234 of the boom actuator 24 or the like is supplied to the tertiary coil 1223 via the inverter 224 and the converter 214 and is contactlessly transmitted to the upper rotating body 102 side and/or the arm 105 side, by the primary coil 1221 and/or the secondary coil 1222 magnetically coupled thereto. As described below, the regenerative power generated during deceleration or the like of the motor 235 of the arm actuator 25 and/or the motor 236 of the bucket actuator 26 is supplied to the secondary coil 1222 via the AC voltage bus 32, and is contactlessly transmitted to the upper rotating body 102 side and/or the boom actuator 24, by the primary coil 1221 and/or the tertiary coil 1223 magnetically coupled thereto. It should be noted that the magnetic coupling between each coil 1221, 1222, and 1223 may be such that the magnitude of the AC voltage contactlessly transmitted is kept stable or may be realized by something like a transformer that changes the magnitude of the AC voltage contactlessly transmitted.

The arm transmission unit 123 is configured by a plurality of coils stored inside a connecting part such as a swivel that connects the arm 105 and the boom 104 while allowing relative rotation around a horizontal rotating axis (105A in FIG. 1). Specifically, the arm transmission unit 123 is configured by a primary coil 1231 connected to the AC voltage bus 32 on the boom 104 side, a secondary coil 1232 connected to the AC voltage bus 32 on the bucket 106 side, and a tertiary coil 1233 connected to the arm actuator 25.

The primary coil 1231, the secondary coil 1232, and the tertiary coil 1233 are magnetically coupled to each other. The AC power supplied from the secondary coil 1222 of the boom transmission unit 122 to the primary coil 1231 via the AC voltage bus 32 is contactlessly transmitted to the bucket 106 side and/or to the arm actuator 25, by the secondary coil 1232 and/or the tertiary coil 1233 magnetically coupled to the primary coil 1231. As such, the arm actuator 25 as the drive unit of the arm 105 drives the arm 105 based on the AC power contactlessly transmitted by the primary coil 1231 and the tertiary coil 1233 in the arm transmission unit 123 as the contactless transmission unit. It should be noted that a magnetic material or the like may be inserted into the gap between the primary coil 1231, the secondary coil 1232, and the tertiary coil 1233 to increase power transmission efficiency.

Besides, the regenerative power generated during deceleration of the motor 235 of the arm actuator 25 or the like is supplied to the tertiary coil 1233 via the inverter 225 and the converter 215 and is contactlessly transmitted to the boom 104 side and/or the bucket 106 side, by the primary coil 1231 and/or the secondary coil 1232 magnetically coupled thereto. As described below, the regenerative power generated during deceleration or the like of the motor 236 of the bucket actuator 26 is supplied to the secondary coil 1232 via the AC voltage bus 32 and is contactlessly transmitted to the boom 104 side and/or the arm actuator 25, by the primary coil 1231 and/or the tertiary coil 1233 magnetically coupled thereto. It should be noted that the magnetic coupling between each coil 1231, 1232, and 1233 may be such that the magnitude of the AC voltage contactlessly transmitted is kept stable or may be realized by something like a transformer that changes the magnitude of the AC voltage contactlessly transmitted.

The bucket transmission unit 124 is configured by a plurality of coils stored inside a connecting part such as a swivel that connects the bucket 106 and the arm 105 while allowing relative rotation around a horizontal rotating axis (106A in FIG. 1). Specifically, the bucket transmission unit 124 is configured by a primary coil 1241 connected to the AC voltage bus 32 on the arm 105 side, and a secondary coil 1242 connected to the bucket actuator 26.

The primary coil 1241 and the secondary coil 1242 are magnetically coupled to each other. The AC power supplied from the secondary coil 1232 of the arm transmission unit 123 to the primary coil 1241 via the AC voltage bus 32 is contactlessly transmitted to the bucket actuator 26, by the secondary coil 1242 magnetically coupled to the primary coil 1241. As such, the bucket actuator 26 as the drive unit of the bucket 106 drives the bucket 106 based on the AC power contactlessly transmitted by the primary coil 1241 and the secondary coil 1242 in the bucket transmission unit 124 as the contactless transmission unit. It should be noted that a magnetic material or the like may be inserted into the gap between the primary coil 1241 and the secondary coil 1242 to increase power transmission efficiency.

Besides, the regenerative power generated during deceleration of the motor 236 of the bucket actuator 26 or the like is supplied to the secondary coil 1242 via the inverter 226 and the converter 216, and is contactlessly transmitted to the arm 105 side, by the primary coil 1241 magnetically coupled thereto. It should be noted that the magnetic coupling between each coil 1241 and 1242 may be such that the magnitude of the AC voltage contactlessly transmitted is kept stable or may be realized by something like a transformer that changes the magnitude of the AC voltage contactlessly transmitted.

The traveling body power supply mechanism 13 is equipped with a DC/AC converter 131, a step-down transmission unit 132, and a pair of step-up transmission units 133A and 133B. The DC/AC converter 131 constitutes a (DC/AC) conversion unit that converts the DC power generated by the battery 10 into AC power. Specifically, the DC/AC converter 131, which is connected to the DC voltage bus 31 in the upper rotating body 102, converts the DC voltage supplied from the DC voltage bus 31 into AC voltage with a frequency of 1 kHz or higher. It should be noted that in case an AC power source that generates AC power is provided instead of the battery 10 that generates DC power, an AC/AC converter that converts the AC power (e.g., less than 100 Hz) generated by the AC power source into AC power having a higher frequency (e.g., 1 kHz or higher) is provided as a conversion unit instead of the DC/AC converter 131. The step-down transmission unit 132 and the pair of step-up transmission units 133A and 133B constitute the contactless transmission units that contactlessly transmit the AC power converted by the DC/AC converter 131 in the lower traveling body 101, which is the joint component of the electric construction machine 100, and the lower traveling body transmission unit that contactless transmission units that contactlessly transmit power to the traveling body actuators 21A and 21B, which are the drive units of the lower traveling body 101.

The step-down transmission unit 132 is configured by a plurality of coils stored inside a connecting part such as a swivel that connects the lower traveling body 101 and the upper rotating body 102 while allowing relative rotation around a vertical rotating axis (102A in FIG. 1). Specifically, the step-down transmission unit 132 is configured by a primary coil 1321 connected to the DC/AC converter 131 on the upper rotating body 102 side, and a secondary coil 1322 connected to the pair of step-up transmission units 133A and 133B in parallel on the lower traveling body 101 side. It should be noted that all or some of the coils of the step-down transmission unit 132 and the DC/AC converter 131 at an earlier stage may be configured as an integrated transformer unit or a contactless transmission unit.

The primary coil 1321 and the secondary coil 1322 are magnetically coupled to each other. The AC power supplied from the DC/AC converter 131 to the primary coil 1321 is contactlessly transmitted to the lower traveling body 101 side, by the secondary coil 1322 magnetically coupled to the primary coil 1321. As described below, the regenerative power generated during deceleration or the like of the motor 231A and/or 231B of the traveling body actuator 21A and/or 21B is supplied to the secondary coil 1322 via the step-up transmission unit 133A and/or 133B and is contactlessly transmitted to the upper rotating body 102 side, by the primary coil 1321 magnetically coupled thereto. It should be noted that a magnetic material or the like may be inserted into the gap between the primary coil 1321 and the secondary coil 1322 to increase power transmission efficiency.

The step-down transmission unit 132 is configured as a transformer that changes the magnitude of the AC voltage contactlessly transmitted in accordance with the difference in the number of turns of the primary coil 1321 and the secondary coil 1322. The step-down transmission unit 132 decreases the AC voltage supplied from the DC/AC converter 131 on the upper rotating body 102 side and contactlessly transmits it to the lower traveling body 101. As described above, the DC voltage of the DC voltage bus 31 to which the DC/AC converter 131 is connected is approximately 200 V to 400 V, for example, but is converted to a lower AC voltage of approximately 40 V to 60 V by the step-down transmission unit 132. The step-down transmission unit 132 is provided in the rotating portion (turning portion) between the upper rotating body 102 and the lower traveling body 101. Even if a leakage of electricity should occur due to the adhesion of moisture-containing soil or water, the voltage is reduced by the step-down transmission unit 132 for ensuring safety. It should be noted that, the boom transmission unit 122 in the working unit power supply mechanism 12 is less likely to come into contact with a person, compared to the step-down transmission unit 132. As such, the boom transmission unit 122 does not need to step down the voltage as significantly as the step-down transmission unit 132. Therefore, the AC voltage of the AC voltage bus 32 in the working unit power supply mechanism 12 is higher than the AC voltage decreased by the step-down transmission unit 132.

The pair of step-up transmission units 133A and 133B are provided in parallel corresponding to a pair of left and right lower traveling bodies 101 such as crawlers. In the following description, they are collectively referred to as step-up transmission unit(s) 133. Similarly, the pair of traveling body actuators 21A and 21B are collectively referred to as traveling body actuator(s) 21, the pair of converters 211A and 211B are collectively referred to as converter(s) 211, the pair of inverters 221A and 221B are collectively referred to as inverter(s) 221, and the pair of motors 231A and 231B are collectively referred to as motor(s) 231.

The step-up transmission unit 133 is configured by a plurality of coils stored inside each of the left and right lower traveling bodies 101. Specifically, the step-up transmission unit 133 is configured by a primary coil 1331 connected to the secondary coil 1322 of the step-down transmission unit 132, and a secondary coil 1332 connected to the traveling body actuator 21. It should be noted that all or some of the coils of the step-up transmission unit 133 and the converter 211 (and even the inverter 221) at a later stage may be configured as an integrated transformer unit or a contactless transmission unit.

The primary coil 1331 and the secondary coil 1332 are magnetically coupled to each other. The AC power supplied from the secondary coil 1322 of the step-down transmission unit 132 to the primary coil 1331 is contactlessly transmitted to the traveling body actuator 21, by the secondary coil 1332 magnetically coupled to the primary coil 1331. Besides, the regenerative power generated during deceleration or the like of the motor 231 of the traveling body actuator 21 is supplied to the secondary coil 1332 via the inverter 221 and the converter 211 and is contactlessly transmitted to the secondary coil 1322 of the step-down transmission unit 132 and/or the primary coil 1331 of the other step-up transmission unit 133, by the primary coil 1331 magnetically coupled thereto. It should be noted that a magnetic material or the like may be inserted into the gap between the primary coil 1331 and the secondary coil 1332 to increase power transmission efficiency.

The step-up transmission unit 133 is configured as a transformer that changes the magnitude of the AC voltage contactlessly transmitted in accordance with the difference in the number of turns of the primary coil 1331 and the secondary coil 1332. The step-up transmission unit 133 increases the AC voltage supplied from the secondary coil 1322 of the step-down transmission unit 132 and contactlessly transmits it to the traveling body actuator 21. As described above, the AC voltage that has been stepped down to approximately 40 V to 60 V by the step-down transmission unit 132 is stepped up by the step-up transmission unit 133 to a magnitude that can operate the converter 211 of the traveling body actuator 21. As described above, the traveling body actuator 21 as the drive unit of the lower traveling body 101 drives the lower traveling body 101 based on the AC power contactlessly transmitted by the step-down transmission unit 132 and the step-up transmission unit 133 as the contactless transmission units.

The regenerative power collected in the actuator 2 of each joint component is used to drive the joint component by another actuator 2 and is also used to charge the capacitor 14 as the regenerative power charge unit, which is configured by an electric double-layer capacitor (EDLC) or the like connected to the DC voltage bus 31. As described below with respect to the power control device according to the present embodiment, the regenerative power collected in the boom actuator 24, the arm actuator 25, and the bucket actuator 26, which are interconnected by the AC voltage bus 32, is preferentially consumed by the group of these actuators, and is returned to the upper rotating body 102 side only when there is a surplus.

Specifically, of the regenerative power collected in the bucket actuator 26, the surplus that is not consumed by either the boom actuator 24 or the arm actuator 25 is converted into AC power by the converter 216 and then contactlessly transmitted to the DC/AC converter 121 of the upper rotating body 102 via the bucket transmission unit 124, the arm transmission unit 123, and the boom transmission unit 122. Of the regenerative power collected in the arm actuator 25, the surplus that is not consumed by either the boom actuator 24 or the bucket actuator 26 is converted into AC power by the converter 215 and then contactlessly transmitted to the DC/AC converter 121 of the upper rotating body 102 via the arm transmission unit 123 and the boom transmission unit 122. Of the regenerative power collected in the boom actuator 24, the surplus that is not consumed by either the arm actuator 25 or the bucket actuator 26 is converted into AC power by the converter 214 and then contactlessly transmitted to the DC/AC converter 121 of the upper rotating body 102 via the boom transmission unit 122.

Figure 4:
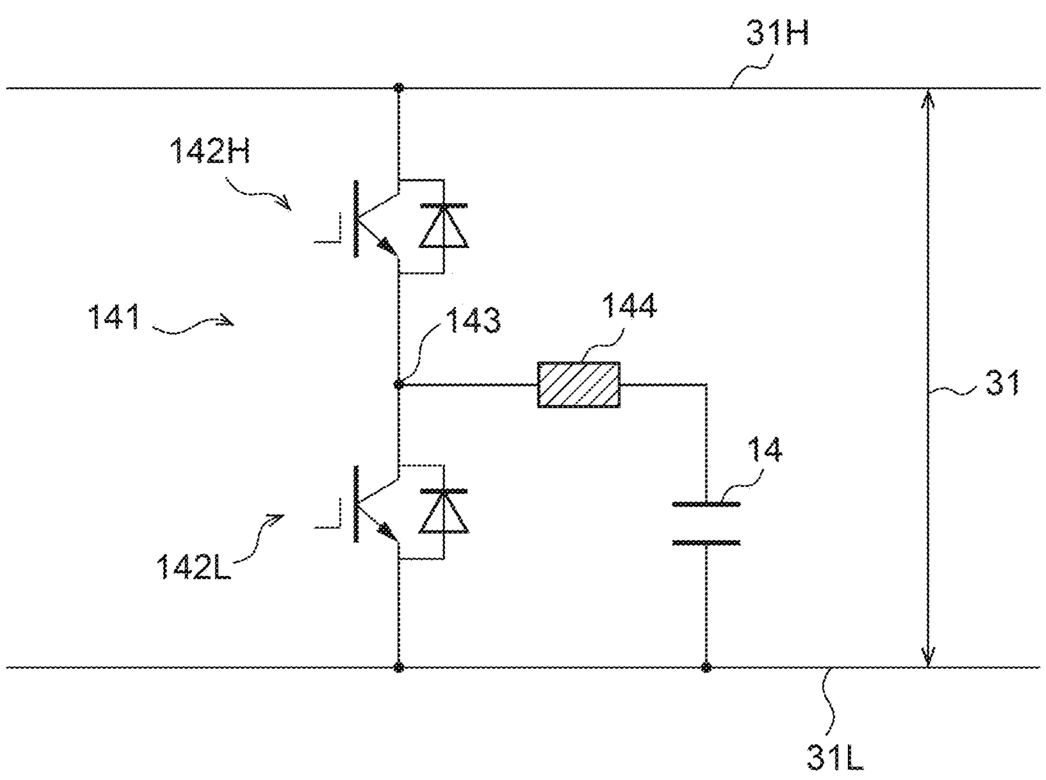
FIG. 4 shows a configuration example of a charge/discharge circuit.

The DC/AC converter 121 that has received the excess regenerative power from at least one of the boom actuator 24, the arm actuator 25, or the bucket actuator 26 converts the AC power into DC power and supplies it to the charge/discharge circuit 141 that charges the capacitor 14. FIG. 4 shows a configuration example of the charge/discharge circuit 141. The charge/discharge circuit 141 is equipped with a high electric potential transistor 142H connected to a high electric potential line 31H of the DC voltage bus 31, a low electric potential transistor 142L connected to a low electric potential line 31L of the DC voltage bus 31, and a step-up/step-down reactor 144 connected in series with the capacitor 14, between a connection point 143 of the high electric potential transistor 142H and the low electric potential transistor 142L, and the low electric potential line 31L. The charge/discharge circuit 141 controls charge/discharge of the capacitor 14 and converts the DC voltage by switching operation of the high electric potential transistor 142H and the low electric potential transistor 142L.

It should be noted that the regenerative power converted into DC power by the DC/AC converter 121 may be used to charge the battery 10 via the charge/discharge converter 11, or may be supplied to other actuators (i.e., the rotating body actuator 22 and/or the traveling body actuator 21) without being charged. Besides, the power charged in the capacitor 14 can be discharged by the charge/discharge circuit 141 and supplied to each actuator 2.

Similarly, the regenerative power collected in the pair of traveling body actuators 21A and 21B is preferentially consumed by the group of these actuators and is returned to the upper rotating body 102 side only when there is a surplus. Specifically, of the regenerative power collected in one of the traveling body actuators 21, the surplus that is not consumed by another traveling body actuator 21 is converted into AC power by the converter 211 and then contactlessly transmitted to the DC/AC converter 131 of the upper rotating body 102 via the step-up transmission unit 133 and the step-down transmission unit 132.

The DC/AC converter 131 that has received the excess regenerative power from at least one of the pair of traveling body actuators 21A and 21B converts the AC power into DC power and supplies it to the charge/discharge circuit 141 that charges the capacitor 14. It should be noted that the regenerative power converted into DC power by the DC/AC converter 131 may be used to charge the battery 10 via the charge/discharge converter 11, or may be supplied to other actuators (i.e., the rotating body actuator 22, the boom actuator 24, the arm actuator 25, the bucket actuator 26 or the like) without being charged. Besides, the regenerative power collected in the rotating body actuator 22 is converted into DC power by the converter 212 and then supplied to the charge/discharge circuit 141 that charges the capacitor 14, the charge/discharge converter 11 that charges the battery 10, or the other actuators (i.e., the traveling body actuator 21, the boom actuator 24, the arm actuator 25, the bucket actuator 26 or the like).

According to the driving apparatus 1 described above, by providing the step-down transmission unit 132, the boom transmission unit 122, the arm transmission unit 123, and the bucket transmission unit 124 as the contactless transmission units, to the lower traveling body 101, the boom 104, the arm 105, and the bucket 106 of the joint components of the electric construction machine 100, it is possible to contactlessly transmit the AC power without preventing the smooth operations of these joint components. In addition, each contactless transmission unit can be simply configured by the plurality of coils. Therefore, the joint component can be prevented from becoming more complicated or larger than the configuration in which wires for transmitting DC power is enclosed in the joint components, as disclosed by Patent Literature 1.

FIG. 5 shows a second configuration example of the driving apparatus 1 of the electric construction machine 100. The same signs are given to the similar components to those in the first configuration example in FIG. 3, and duplicated explanations are omitted. In the second configuration example, a DC/AC convertor 15 as a DC/AC conversion unit that converts the DC power generated by the battery 10 into AC power is provided in association with the battery 10.

When discharging the battery 10, the DC voltage by discharging the battery 10 is converted by the DC/AC convertor 15 into AC power with a frequency of 1 kHz or higher and supplied to the AC voltage bus 33. When charging the battery 10, the AC power in the AC voltage bus 33 is converted into DC power by the DC/AC convertor 15 to charge the battery 10. The AC voltage bus 33 to which the AC power is supplied from the DC/AC convertor 15 supplies the AC power with a frequency of 1 kHz or higher to the rotating body actuator 22, the working unit power supply mechanism 12, and the traveling body power supply mechanism 13.

In the first configuration example in FIG. 3, the DC power from the DC voltage bus 31 is input to the converter 212 of the rotating body actuator 22, but in the second configuration example in FIG. 5, the AC power from the AC voltage bus 33 is input to the converter 212 of the rotating body actuator 22. The converter 212 of the rotating body actuator 22 converts the input AC power into DC power that can operate the inverter 222 at a later stage.

The working unit power supply mechanism 12 is similar to that of the first configuration example, except that the DC/AC converter 121 in FIG. 3 is not provided. The function of the DC/AC converter 121 in FIG. 3 is performed by the DC/AC convertor 15 in FIG. 5. That is, the DC/AC convertor 15 supplies AC power to the primary coil of the boom transmission unit 122 via the AC voltage bus 33.

The traveling body power supply mechanism 13 is similar to that of the first configuration example, except that the DC/AC converter 131 in FIG. 3 is not provided. The function of the DC/AC converter 131 in FIG. 3 is performed by the DC/AC convertor 15 in FIG. 5. That is, the DC/AC convertor 15 supplies AC power to the primary coil of the step-down transmission unit 132 via the AC voltage bus 33.

In the second configuration example shown in FIG. 5, an AC/DC converter 16 is provided at an earlier stage than the capacitor 14 and the charge/discharge circuit 141, which constitute the regenerative power charge unit. the AC/DC converter 16 converts the AC power in the AC voltage bus 33 into DC power for the charge/discharge circuit 141 to process the charging of the capacitor 14. Besides, during the discharge process of the capacitor 14, the DC power output by the charge/discharge circuit 141 is converted to AC power by the AC/DC converter 16 and supplied to the AC voltage bus 33.

Figure 6:
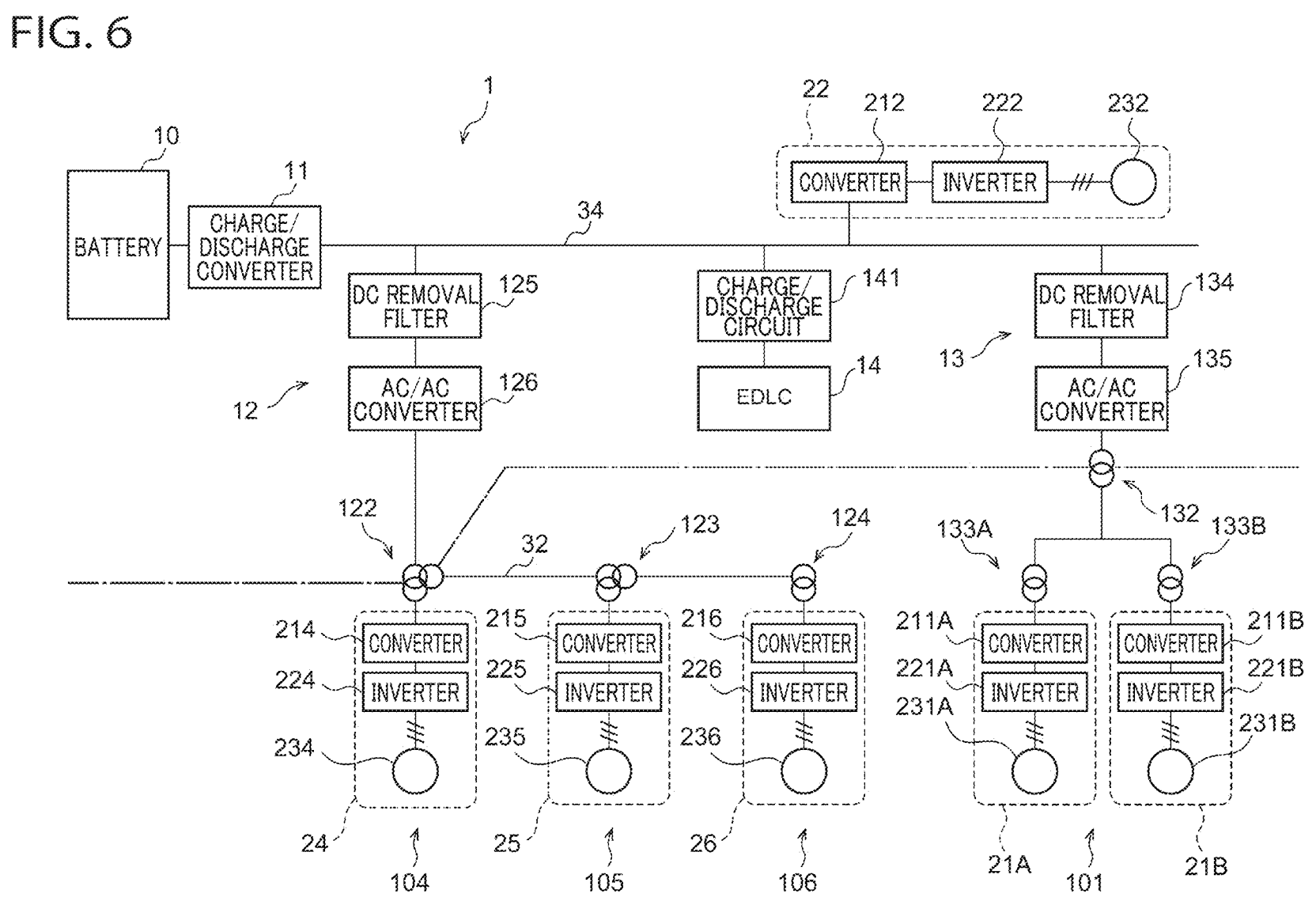
Figure 7:
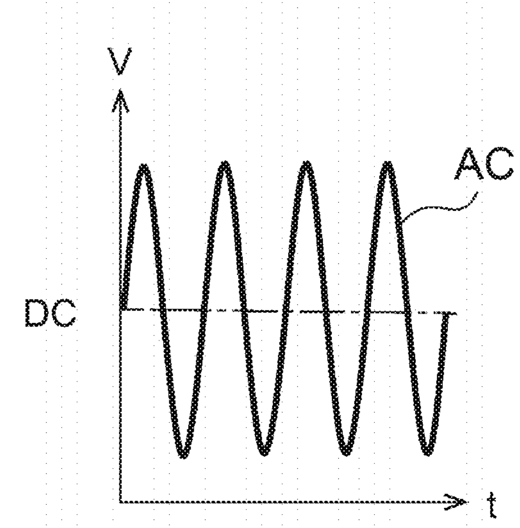
FIG. 7 schematically shows the change with time t in voltage V supplied to a DC/AC voltage bus by a charge/discharge converter.

FIG. 6 shows a third configuration example of the driving apparatus 1 of the electric construction machine 100. The same signs are given to the similar components to those in the first configuration example in FIG. 3, and duplicated explanations are omitted. In the third configuration example, the charge/discharge converter 11 functions as an AC superimposition unit that superimposes AC power with a frequency of 1 kHz or higher on the DC power generated by the battery 10. FIG. 7 schematically shows the change with time t in voltage V supplied to the DC/AC voltage bus 34 by the charge/discharge converter 11. The “DC” represents the DC voltage generated by the battery 10, and the AC voltage indicated by “AC” is superimposed on it by the charge/discharge converter 11 to produce the voltage V to be supplied to the DC/AC voltage bus 34.

The converter 212 of the rotating body actuator 22 and the charge/discharge circuit 141, which are directly connected to the DC/AC voltage bus 34, operate as in the first configuration example in FIG. 3, based mainly on the DC component of the voltage V supplied from the DC/AC voltage bus 34.

The working unit power supply mechanism 12 is equipped with a DC removal filter 125 as a DC removal filter and an AC/AC converter 126 as an AC conversion unit, instead of the DC/AC converter 121 in FIG. 3. The DC removal filter 125 is connected to the output of the charge/discharge converter 11 as an AC superimposition unit and removes DC power and allows AC power to pass through it, thereby functioning similarly to the DC/AC converter 121 as a DC/AC conversion unit. In the example of FIG. 7, the DC component "DC" is removed by the DC removal filter 125, and the AC component "AC" passes through the DC removal filter 125.

The AC power that has passed through the DC removal filter 125 may be supplied directly to the primary coil of the boom transmission unit 122, but in the example of FIG. 6, the AC/AC converter 126 is provided together with an unshown resonant circuit to increase the efficiency of the contactless transmission in the boom transmission unit 122. The AC/AC converter 126 converts the frequency of the AC power that has passed through the DC removal filter 125 and supplies it to the boom transmission unit 122 as the contactless transmission unit. Specifically, the AC/AC converter 126 increases the frequency of the AC power and transitions the AC power to a higher frequency band where the efficiency of the contactless transmission by the boom transmission unit 122 increases. The AC power whose frequency is increased by the AC/AC converter 126 is supplied to the primary coil of the boom transmission unit 122. It should be noted that the AC/AC converter 126 for increasing the efficiency of the contactless transmission in the boom transmission unit 122 may be provided in the first configuration example in FIG. 3 or in the second configuration example in FIG. 5.

The traveling body power supply mechanism 13 is equipped with a DC removal filter 134 as a DC removal filter and an AC/AC converter 135 as an AC conversion unit, instead of the DC/AC converter 131 in FIG. 3. The DC removal filter 134 is connected to the output of the charge/discharge converter 11 as an AC superimposition unit and removes DC power and allows AC power to pass through it, thereby functioning similarly to the DC/AC converter 131 as a DC/AC conversion unit. In the example of FIG. 7, the DC component "DC" is removed by the DC removal filter 134, and the AC component "AC" passes through the DC removal filter 134.

The AC power that has passed through the DC removal filter 134 may be supplied directly to the primary coil of the step-down transmission unit 132, but in the example of FIG. 6, the AC/AC converter 135 is provided together with an unshown resonant circuit to increase the efficiency of the contactless transmission in the step-down transmission unit 132. The AC/AC converter 135 converts the frequency of the AC power that has passed through the DC removal filter 134 and supplies it to the step-down transmission unit 132 as the contactless transmission unit. Specifically, the AC/AC converter 135 increases the frequency of the AC power and transitions the AC power to a higher frequency band where the efficiency of the contactless transmission by the step-down transmission unit 132 increases. The AC power whose frequency is increased by the AC/AC converter 135 is supplied to the primary coil of the step-down transmission unit 132. It should be noted that the AC/AC converter 135 for increasing the efficiency of the contactless transmission in the step-down transmission unit 132 may be provided in the first configuration example in FIG. 3 or in the second configuration example in FIG. 5.

FIG. 8 shows a configuration example of a power control device 4 of the electric construction machine 100. The power control device 4 is equipped with a power demand acquisition unit 41, an available power acquisition unit 42, a power comparison unit 43, a determination unit 44, an identification unit 45, and a drive information acquisition unit 47.

Figure 9:
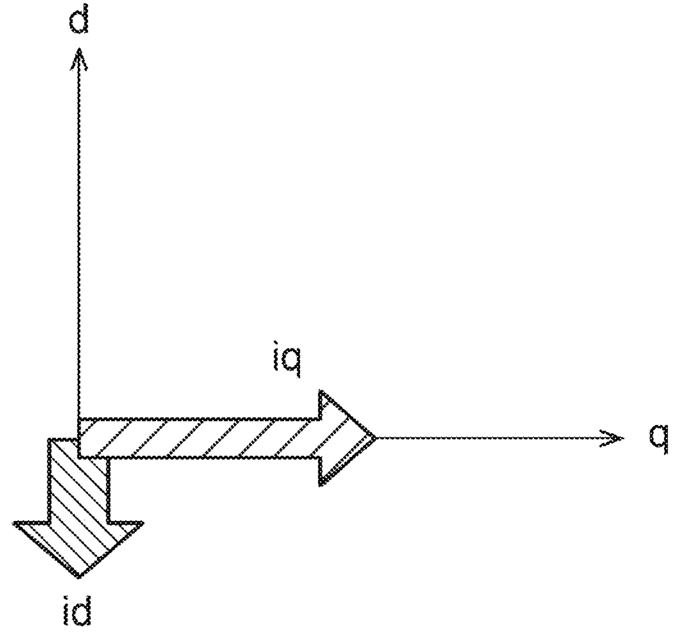
FIG. 9 shows current command value of a motor in each actuator in the dq coordinate system.

The power demand acquisition unit 41 acquires the motor rotation speed N and current command values iq and id in each actuator 2, as information indicating the power demand of each actuator 2 of the lower traveling body 101, the upper rotating body 102, the boom 104, the arm 105, and the bucket 106. These information may be transmitted to the power demand acquisition unit 41 by an unshown communication device built into each actuator 2 using short-range wireless communication technology or the like, may modulate the AC power supplied to each actuator 2 as a carrier wave to be transmitted to the power demand acquisition unit 41 via the contactless transmission units 122, 123, 124, 132, and 133. FIG. 9 shows current command value of a motor in each actuator 2 in the dq coordinate system. In the dq coordinate system, the d-axis current id does not contribute to torque generation in the motor, and when id=0, the power demand of each actuator 2 is calculated to be iq*N, which is the q-axis current iq multiplied by the rotation speed N. On the other hand, when weak field control is used to reduce the back electromotive force due to the field magnet at high motor rotation speed, a negative d-axis current id must also flow, therefore the power demand acquisition unit 41 calculates the power demand of each actuator 2 by considering not only the q-axis current iq but also the d-axis current id. It should be noted that the power demand acquisition unit 41 may estimate the power demand of each actuator 2, based on the operation by an operator of an operation unit 40 of the electric construction machine 100, i.e., the operation command to each actuator 2.

The available power acquisition unit 42 acquires the power that can be supplied to each actuator 2 by the power control device 4. The available power of the power control device 4 is the sum of the charged amount or dischargeable amount of the battery 10, the charged amount or dischargeable amount of the capacitor 14, and the regenerative power collected in each actuator 2. As information indicating the charged amount or dischargeable amount of the battery 10, the available power acquisition unit 42 acquires the SOC (State Of Charge), which is the charge rate of the battery 10, and the dischargeable amount. As information indicating the charged amount or dischargeable amount of the capacitor 14, the available power acquisition unit 42 acquires the SOC, which is the charge rate of the capacitor 14. The regenerative power collected in each actuator 2 is roughly classified into the working unit regenerative power collected in the actuators 24, 25, and 26 of the working unit (i.e., the boom 104, the arm 105, and the bucket 106), the traveling body regenerative power collected in the traveling body actuators 21A and 21B of the lower traveling body 101, and the rotating body regenerative power collected in actuator 22 of the upper rotating body 102. As described below, the working unit regenerative power is preferentially consumed in the actuators 24, 25, and 26 of the working unit, and the traveling body regenerative power is preferentially consumed in the traveling body actuators 21A and 21B of the lower traveling body 101.

The power comparison unit 43 compares the total power demand of each actuator 2 acquired by the power demand acquisition unit 41 and the available power of the power control device 4 acquired by the available power acquisition unit 42. If the total power demand of each actuator 2 is greater than the available power of the power control device 4, the determination unit 44 determines an actuator 2 that supplies power less than the power demand, in accordance with the operation of the electric construction machine 100 identified by the identification unit 45 and/or the moment of inertia of the working unit acquired by the moment of inertia acquisition unit 46. It should be noted that the determination unit 44 may determine the power to be supplied to each actuator 2, in accordance with the operation of the electric construction machine 100 identified by the identification unit 45, regardless of the relationship between the total power demand of each actuator 2 and the available power of the power control device 4. Besides, if the total power demand of each actuator 2 is greater than the available power of the power control device 4, the determination unit 44 determines to supply power less than the power demand to an actuator 2 of the plurality of actuators 2 that requires less power in accordance with the operation of the electric construction machine 100 identified by the identification unit 45. A concrete example of the power supply amount determination process by the determination unit 44 is described below.

The available power of the power control device 4 acquired by the available power acquisition unit 42 is supplied to each actuator 2 in accordance with the allocation determined by the determination unit 44. Here, the excess regenerative power collected in each actuator 2 is charged to the battery 10 and/or the capacitor 14 by the charge/discharge converter 11 and/or the charge/discharge circuit 141. Besides, the DC/AC converter 121, which is responsible for the bidirectional power transmission between the upper rotating body 102 and the working unit, converts the DC power from the upper rotating body 102 side, such as the battery 10 or the capacitor 14, into AC power and supplies it to the actuators 24, 25, and 26 of the working unit. At the same time, the DC/AC converter 121 converts the excess regenerative power collected in the actuators 24, 25, and 26 of the working unit from AC to DC and supplies or charges it to the battery 10, the capacitor 14 or the like of the upper rotating body 102. Similarly, the DC/AC converter 131, which is responsible for the bidirectional power transmission between the upper rotating body 102 and the lower traveling body 101, converts the DC power from the upper rotating body 102 side, such as the battery 10 or the capacitor 14, into AC power and supplies it to the actuators 21A and 21B of the lower traveling body 101. At the same time, the DC/AC converter 131 converts the excess regenerative power collected in the actuators 21A and 21B of the lower traveling body 101 from AC to DC and supplies or charges it to the battery 10, the capacitor 14 or the like of the upper rotating body 102. Besides, the determination unit 44 determines the allocation of power (including regenerative power) among the boom transmission unit 122, the arm transmission unit 123, and the bucket transmission unit 124 connected in series. Similarly, the determination unit 44 determines the allocation of power (including regenerative power) between the two step-up transmission units 133A and 133B connected in series.

The drive information acquisition unit 47 acquires drive information of each joint component of the electric construction machine 100, i.e., each actuator 2 of the lower traveling body 101, the upper rotating body 102, the boom 104, the arm 105, and the bucket 106. Examples of the drive information of each actuator 2 include: operation commands by an operator received by the operation unit 40 of the electric construction machine 100; drive commands such as voltage command values and current command values applied to a motor in each actuator 2 which are generated based on the operation commands; measured data of operating parameters such as rotation speed, current, and torque of a motor in each actuator 2; and measured data of acceleration sensors or the like provided in each joint component. The identification unit 45 identifies the operation or motion performed by each joint component of the electric construction machine 100 based on the drive information acquired by the drive information acquisition unit 47 and the correspondence between the operation and the drive information stored in a memory or other storage unit (not shown). The identification unit 45 may identify the operation of the electric construction machine 100 by referring to a table that maps the operation of the electric construction machine 100 to the drive information acquired by the drive information acquisition unit 47 or may identify the operation of the electric construction machine 100 through artificial intelligence that conducted machine learning with comprehensive teacher data equivalent to such a table. The moment of inertia acquisition unit 46 provided in the identification unit 45 has a weight acquisition unit 461 that acquires the weight of the object being carried by the bucket 106 and a distance acquisition unit 462 that acquires the distance of the bucket 106 from the rotating axis of the upper rotating body 102. The moment of inertia acquisition unit 46 acquires the moment of inertia around the rotating axis of the working unit including the carried object. It should be noted that the weight or mass of the working unit (i.e., the boom 104, the arm 105, and the bucket 106) itself necessary in calculating the moment of inertia of the working unit shall be stored in advance in the moment of inertia acquisition unit 46.

Figure 10:
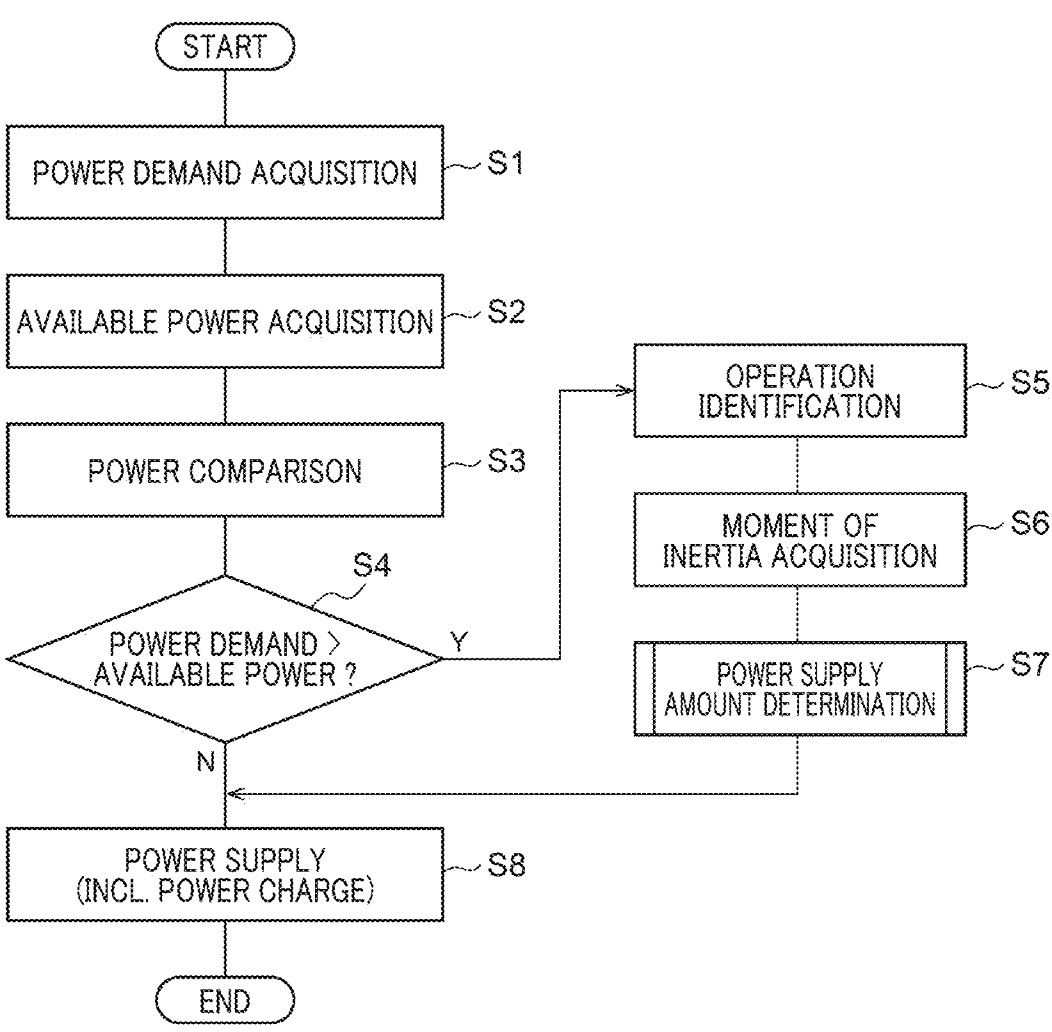
FIG. 10 is a flowchart showing an example of a power control process by the power control device.

FIG. 10 is a flowchart showing an example of the power control process by the power control device 4. In the description of the flowchart, "S" means step or process. In S1, the power demand acquisition unit 41 acquires or calculates the power demand of each actuator 2 of the lower traveling body 101, the upper rotating body 102, the boom 104, the arm 105, and the bucket 106. In S2, the available power acquisition unit 42 acquires the power that can be supplied to each actuator 2 by the power control device 4. In S3, the power comparison unit 43 compares the total power demand of each actuator 2 acquired in S1 with the available power of the power control device 4 acquired in S2. As the result of the power comparison in S3, if the total power demand of each actuator 2 is greater than the available power of the power control device 4 (Yes in S4), the process proceeds to S5, and if the total power demand of each actuator 2 is less than the available power of the power control device 4 (No in S4), the process proceeds to S8.

In S5, the drive information acquisition unit 47 acquires drive information of the actuator 2 of each joint component of the electric construction machine 100, and the identification unit 45 identifies the operation performed by the electric construction machine 100 using the lower traveling body 101, the upper rotating body 102, the boom 104, the arm 105, and the bucket 106, based on the acquired drive information. In S6, the moment of inertia acquisition unit 46 acquires the moment of inertia around the rotating axis of the working unit including the carried object, based on the weight of the carried object of the bucket 106 acquired by the weight acquisition unit 461 and the distance of the bucket 106 from the rotating axis acquired by the distance acquisition unit 462. In S7, the determination unit 44 determines the power to be supplied to each actuator 2, in accordance with the operation of the electric construction machine 100 identified in S5 and/or the moment of inertia of the working unit acquired in S6. For example, the determination unit 44 determines, in accordance with the weight of the carried object acquired in S6, that the power to be supplied to the actuator 2 that bears less weight or load will be less than the power to be supplied to the actuator 2 that bears more weight or load, among actuators 2 of the upper rotating body 102, the boom 104, the arm 105, and the bucket 106. Besides, the determination unit 44 increases the power supplied to the rotating body actuator 22 as the distance acquired in S6 becomes greater.

In S8, the available power of the power control device 4 acquired in S2 is supplied or distributed to each actuator 2 via the charge/discharge converter 11, the charge/discharge circuit 141, the DC/AC converters 121 and 131 or the like. If S4 is determined to be No, in principle, each actuator 2 will be supplied with the power in accordance with the power demand acquired in S1. If S4 is determined to be Yes, the power is supplied to each actuator 2 in accordance with the allocation determined in S7. It should be noted that if excess regenerative power exceeding the power demand of each actuator 2 is generated in S8, it is charged to the battery 10 and/or the capacitor 14, by the charge/discharge converter 11 and/or the charge/discharge circuit 141.

Figure 11:
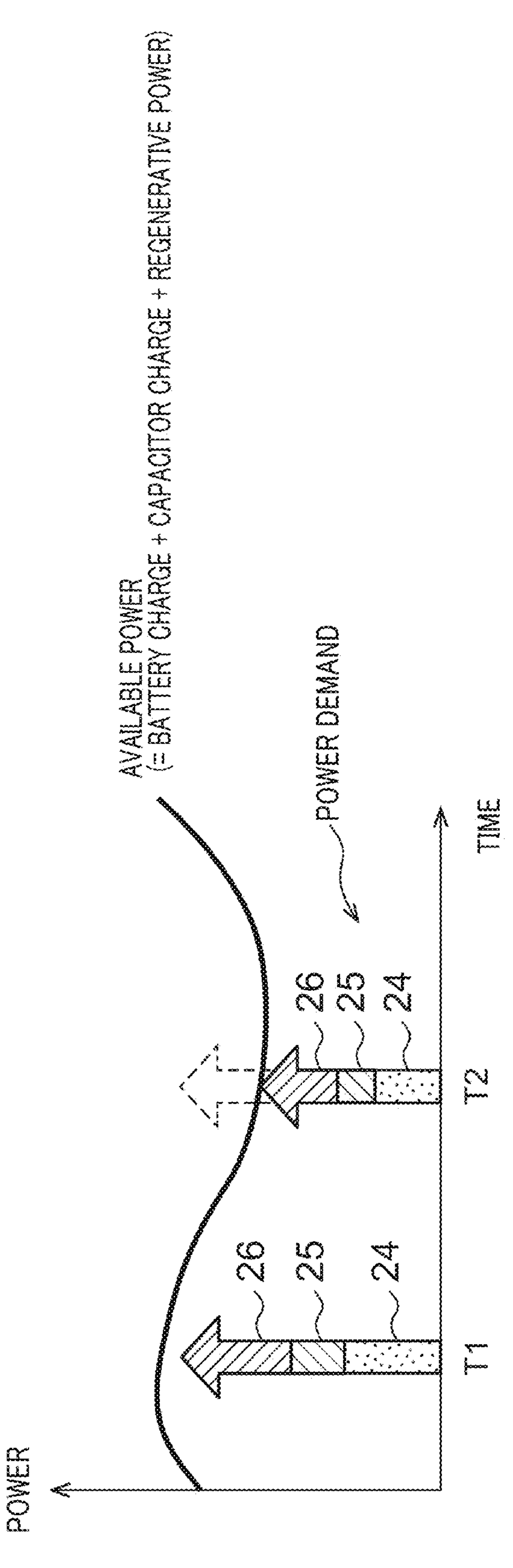
FIG. 11 schematically shows an example of a determination process, a power allocation amount determination process, and a power supply process.

FIG. 11 schematically shows an example of the determination process in S4, the power allocation amount determination process in S7, and the power supply process in S8. The vertical axis represents power, and the horizontal axis represents time. The curve represents the available power of the power control device 4 at each time. As described above, the available power of the power control device 4 is the sum of the charged amount of the battery 10, the charged amount of the capacitor 14, and the regenerative power collected in each actuator 2, which significantly varies with time. The stacked bar graphs shown at times T1 and T2 represent the power demand of each actuator 2 at each of these times. It should be noted that, for simplicity of the figure and the description, only the power demand of actuators 24, 25, and 26 of the working unit is shown. Therefore, the available power shown in the figure includes only the available power for the actuators 24, 25, and 26 of the working unit and does not include the available power source for the traveling body actuators 21A and 21B and the rotating body actuator 22.

At time T1, since the total power demand of each actuator 2 is less than the available power of the power control device 4, S4 is determined to be No. In the following S8, the power is supplied to each actuator 2 in accordance with the power demand shown in the figure. At time T2, the initial total power demand of each actuator 2 is indicated by the dotted line. In this case, S4 is determined to be Yes, because the total power demand of each actuator 2 is larger than the available power of the power control device 4. In S7, the determination unit 44 determines the power to be supplied to each actuator 2, so that the total power demand of each actuator 2 becomes less than the available power of the power control device 4. As a result, the power is supplied to each actuator 2 within the available power of the power control device 4 in S8. As such, if the total power demand of each actuator 2 is greater than the available power of the power control device 4, the power allocation to at least one of the actuators 2 is reduced based on the determination by the determination unit 44, so that appropriate power allocation can be realized within the available power.

Figure 12:
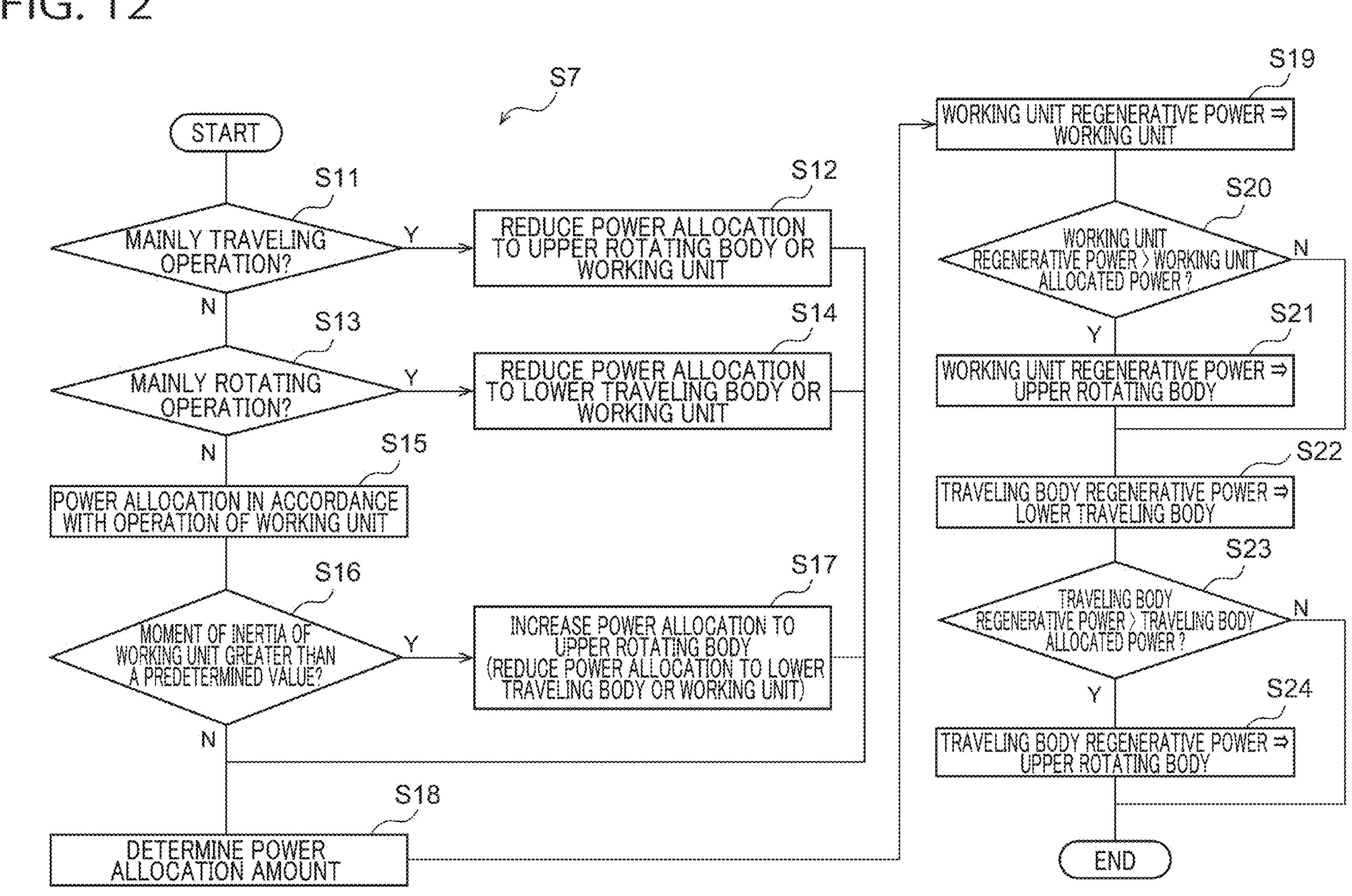
FIG. 12 is a flowchart showing an example of the power allocation amount determination process by a power allocation unit.

FIG. 12 is a flowchart showing an example of the power allocation amount determination process in S7 by the determination unit 44. In S11, it is determined whether or not the main operation of the electric construction machine 100 identified in S5 is the traveling operation by the lower traveling body 101. If S11 is determined to be Yes, the process proceeds to S12, where the power allocation to the lower traveling body 101 responsible for the main operation is kept the same, while the power allocation to the upper rotating body 102 or the working unit that requires less power is reduced. If S11 is determined to be No, the process proceeds to S13, where it is determined whether or not the main operation of the electric construction machine 100 identified in S5 is the rotating operation by the upper rotating body 102. If S13 is determined to be Yes, the process proceeds to S14, where the power allocation to the upper rotating body 102 responsible for the main operation is kept the same, while the power allocation to the lower traveling body 101 or the working unit that requires less power is reduced. If S13 is determined to be No, the process proceeds to S15, where the power is allocated to each actuator 2 in accordance with the operation of the working unit identified in S5 (e.g., digging operation, rotating and loading operation, trench digging operation, ground leveling operation).

FIG. 13 shows an example of the power allocation to each actuator 2 in accordance with the work done by a working unit. The stacked bar graph of "power demand" represents the power demand of each actuator 2, and the stacked bar graphs of "digging operation" and "90-degree rotating and loading operation" represent the power allocated to each actuator 2 in accordance with the respective operations in S15. As shown in the figure, the "power demand" exceeds the available power of the power control device 4, but in the "digging operation" and "90-degree rotating and loading operation", appropriate power allocation is realized for each operation within the available power of the power control device 4. In the "digging operation", more power is allocated to the actuators 24, 25, and 26 of the working unit, which are responsible for the digging operation, while the power to the traveling body actuators 21A and 21B and the rotating body actuator 22, which require less power, is suppressed or reduced. In the "90-degree rotating and loading operation", not only the working unit but also the upper rotating body 102 require a large amount of power, therefore the power is allocated to the rotating body actuator 22 in accordance with the power demand. On the other hand, since the lower traveling body 101 is stopped in the "90-degree rotating and loading operation", the allocation or supply of power to the traveling body actuators 21A and 21B, which require less power, is stopped.

In S16, it is determined whether or not the moment of inertia around the rotating axis of the working unit acquired in S6 is greater than a predetermined value. if S16 is determined to be Yes, the process proceeds to S17, where the power allocation to the upper rotating body 102 is increased from S15. This is because a larger moment of inertia of the working unit will increase the power consumption in the upper rotating body 102 that rotates the working unit. It should be noted that the power additionally allocated to the upper rotating body 102 is secured by reducing the power allocation to the lower traveling body 101 or the working unit that requires less power. In S18, the amount of power allocated to each actuator 2 is determined through the above processes S11 to S17. As explained in FIG. 11 and FIG. 13, the total amount of power allocated to each actuator 2 becomes less than the available power of the power control device 4.

S19 and subsequent processes are related to the allocation of regenerative power collected in each actuator 2. In S19, the working unit regenerative power collected in the actuators 24, 25, and 26 of the working unit (which can be detected in S2) is preferentially allocated to the group of the working unit actuators. In S20, it is determined whether or not the total amount of the working unit regenerative power detected in S2 is greater than the total amount of the power allocated to the actuators 24, 25, and 26 of the working unit determined in S18. If S20 is determined to be Yes, the process proceeds to S21, where the excess working unit regenerative power is returned to the upper rotating body 102 side or the battery 10/the capacitor 14 side via the DC/AC converter 121.

In S22, the traveling body regenerative power collected in the traveling body actuators 21A and 21B of the lower traveling body 101 (which can be detected in S2) is preferentially allocated to the group of the traveling body actuators. In S23, it is determined whether or not the total amount of the traveling body regenerative power detected in S2 is greater than the total amount of the power allocated to the traveling body actuators 21A and 21B of the lower traveling body 101 determined in S18. If S23 is determined to be Yes, the process proceeds to S24, where the excess traveling body regenerative power is returned to the upper rotating body 102 side or the battery 10/the capacitor 14 side via the DC/AC converter 131.

According to the above embodiment, if the total power demand of the plurality of actuators 2 is greater than the available power of the power source, the power allocation to at least one of the actuators 2 is reduced based on the determination by the determination unit 44, so that appropriate power allocation can be realized within the available power. In particular, if the power source is configured by the battery 10, the continuous operating time of the power control device 4 and the electric construction machine 100 can be extended by efficiently utilizing the limited charged amount.

The present invention has been described above based on embodiments. It will be understood by those skilled in the art that the embodiments are examples, that various variations are possible in the combination of the respective components and/or the respective processing steps, and that such variations are also within the scope of the present invention.

In the configuration example of the power control device 4 in FIG. 8, the AC power supplied to each actuator 2 is contactlessly transmitted via the contactless transmission units 122, 123, 124, 132, and 133, but the power control device 4 according to the present invention is also applicable to an electric construction machine with a configuration in which the DC power generated by the battery 10 is supplied to each actuator 2 by means of wiring.

Although the embodiment describes the example of the EMA in which the actuator 2 directly drives each joint component of the electric construction machine 100, each joint component of the electric construction machine 100 may be indirectly driven by the actuator 2. For example, in case each joint component is directly driven by a hydraulic motor, a hydraulic cylinder, or another hydraulic device, the actuator 2 may be configured as the EHA by using the motor 230 in controlling a hydraulic valve that controls the hydraulic pressure to each hydraulic device.

Besides, in the embodiment, the construction machine or the electric construction machine having the lower traveling body 101, the upper rotating body 102, the boom 104, the arm 105, and the bucket 106 as the joint components is exemplified. However, the present invention can be applied to any construction machine with other joint components. For example, bulldozers, scrapers, excavators, shovels, hauling machines, dump trucks, trailers, shovel loaders, fork loaders, belt conveyors, cranes, construction lifts, forklifts, pile driving machines, drilling machines, boring machines, rock drills, road rollers, truck mixers, compressors, pumps, winches, or the like are examples of such a construction machine.

It should be noted that the functional configuration of each device described in the embodiment can be realized by hardware resources or software resources, or by cooperation of hardware resources and software resources. As hardware resources, processor, ROM, RAM, and other LSI can be utilized. As software resources, operating system, application, and other program can be utilized.

In the embodiments disclosed in the present specification, some or all of a plurality of functions provided in a distributed manner may be provided by incorporating them into an integral function. Conversely, an integral function incorporating a plurality of functions may be provided by distributing some or all of the plurality of functions. Regardless of whether the functions are incorporated or distributed, it is sufficient if they are configured so that the purpose of the present invention can be achieved.

The present invention relates to driving technology that uses electric power to drive a joint component of a machine.

1 driving apparatus, 2 actuator, 4 power control device, 10 battery, 11 charge/discharge converter, 12 working unit power supply mechanism, 13 traveling body power supply mechanism, 14 capacitor, 15 DC/AC converter, 16 AC/DC converter, 21 traveling body actuator, 22 rotating body actuator, 24 boom actuator, 25 arm actuator, 26 bucket actuator, 31 DC voltage bus, 32 AC voltage bus, 33 AC voltage bus, 34 DC/AC voltage bus, 40 operation unit, 41 power demand acquisition unit, 42 available power acquisition unit, 43 power comparison unit, 44 determination unit, 45 identification unit, 46 moment of inertia acquisition unit, 100 electric construction machine, 101 lower traveling body, 102 upper rotating body, 104 boom, 105 arm, 106 bucket, 121 DC/AC converter, 122 boom transmission unit, 123 arm transmission unit, 124 bucket transmission unit, 125 DC removal filter, 126 AC/AC converter, 131 DC/AC converter, 132 step-down transmission unit, 133 step-up transmission unit, 134 DC removal filter, 135 AC/AC converter, 141 charge/discharge circuit, 230 motor, 461 weight acquisition unit, 462 distance acquisition unit.

What is claimed is:

1. A driving apparatus comprising:

a conversion unit that converts power generated by a power source to AC power having a higher frequency;

a contactless transmission unit that contactlessly transmits the converted AC power in a joint component of an electric machine;

a drive unit that drives the joint component based on the transmitted AC power; and an AC voltage bus, wherein the electric machine is a construction machine comprising a plurality of joint components, the power source is a DC power source that generates DC power, the conversion unit converts the DC power into AC power, the conversion unit is provided in at least one of the plurality of joint components, the joint component is at least one of a lower traveling body that can travel on the ground, an upper rotating body that is rotatably attached to the lower traveling body, a boom capable of being raised and lowered that is attached to the upper rotating body, an arm that is bendably attached to the boom, and a bucket that is bendably attached to the arm, the conversion unit is provided in the upper rotating body, the contactless transmission unit includes a boom transmission unit that contactlessly transmits power to the drive unit of the boom, an arm transmission unit that contactlessly transmits power to the drive unit of the arm, and a bucket transmission unit that contactlessly transmits power to the drive unit of the bucket, the conversion unit transmits the converted AC power to the boom transmission unit, the boom transmission unit transmits the AC power to the arm transmission unit, and the arm transmission unit transmits the AC power to the bucket transmission unit, and the AC voltage bus directly connects the boom transmission unit, the arm transmission unit, and the bucket transmission unit.

2. The driving apparatus according to claim 1, further comprising:

a drive information acquisition unit that acquires drive information of a plurality of the drive units;

an identification unit that identifies, based on the drive information, the operation performed by the construction machine through the lower traveling body, the boom, the arm, and the bucket; and a determination unit that determines the power to be transmitted to the plurality of drive units via the contactless transmission unit, in accordance with the identified operation of the construction machine.

3. The driving apparatus according to claim 1, wherein the contactless transmission unit includes a lower traveling body transmission unit that contactlessly transmits power to the drive unit of the lower traveling body, and wherein the lower traveling body transmission unit comprises a step-down transmission unit that steps down the AC voltage converted by the conversion unit of the upper rotating body at the rotating portion between the upper rotating body and the lower traveling body, and contactlessly transmits it, and a step-up transmission unit that steps up the AC voltage stepped down by the step-down transmission unit, and contactlessly transmits the power to the drive unit of the lower traveling body.

4. The driving apparatus according to claim 1, wherein the DC power generated by the DC power source is transmitted to the drive unit of the upper rotating body without being converted by the conversion unit.

5. The driving apparatus according to claim 1, further comprising a regenerative power charge unit that charges regenerative power collected in the drive unit, wherein the contactless transmission unit contactlessly transmits the AC power of the regenerative power collected in the drive unit to the conversion unit, and wherein the conversion unit converts the AC power of the regenerative power transmitted from the contactless transmission unit into DC power and transmits it to the regenerative power charge unit.

6. The driving apparatus according to claim 1, further comprising an AC superimposition unit that superimposes AC power on the DC power generated by the DC power source, and wherein the conversion unit is connected to the output of the AC superimposition unit and is configured by a DC removal filter that removes the DC power and allows the AC power to pass through.

7. The driving apparatus according to claim 6, further comprising an AC conversion unit that converts the frequency of the AC power that has passed through the DC removal filter and transmits it to the contactless transmission unit.

8. The driving apparatus according to claim 1, wherein the conversion unit converts the power generated by the power source into AC power with a frequency of 1 kHz or higher.

9. A driving method comprising:

convert, by a conversion unit, power generated by a power source to AC power having a higher frequency;

contactlessly transmit, by a contactless transmission unit, the converted AC power in a joint component of an electric machine; and drive, by a drive unit, the joint component based on the transmitted AC power, wherein the electric machine is a construction machine comprising a plurality of joint components, the power source is a DC power source that generates DC power, the conversion unit converts the DC power into AC power, the conversion unit is provided in at least one of the plurality of joint components, the joint component is at least one of a lower traveling body that can travel on the ground, an upper rotating body that is rotatably attached to the lower traveling body, a boom capable of being raised and lowered that is attached to the upper rotating body, an arm that is bendably attached to the boom, and a bucket that is bendably attached to the arm, the conversion unit is provided in the upper rotating body, the contactless transmission unit includes a boom transmission unit that contactlessly transmits power to the drive unit of the boom, an arm transmission unit that contactlessly transmits power to the drive unit of the arm, and a bucket transmission unit that contactlessly transmits power to the drive unit of the bucket, the conversion unit transmits the converted AC power to the boom transmission unit, the boom transmission unit transmits the AC power to the arm transmission unit, the arm transmission unit transmits the AC power to the bucket transmission unit, and the driving method further comprises directly connecting an AC voltage bus to the boom transmission unit, the arm transmission unit, and the bucket transmission unit.

10. A driving program causing a computer to perform:

convert, by a conversion unit, power generated by a power source to AC power having a higher frequency;

contactlessly transmit, by a contactless transmission unit, the converted AC power in a joint component of an electric machine; and drive, by a drive unit, the joint component based on the transmitted AC power, wherein the electric machine is a construction machine comprising a plurality of joint components, the power source is a DC power source that generates DC power, the conversion unit converts the DC power into AC power, the conversion unit is provided in at least one of the plurality of joint components, the joint component is at least one of a lower traveling body that can travel on the ground, an upper rotating body that is rotatably attached to the lower traveling body, a boom capable of being raised and lowered that is attached to the upper rotating body, an arm that is bendably attached to the boom, and a bucket that is bendably attached to the arm, the conversion unit is provided in the upper rotating body, the contactless transmission unit includes a boom transmission unit that contactlessly transmits power to the drive unit of the boom, an arm transmission unit that contactlessly transmits power to the drive unit of the arm, and a bucket transmission unit that contactlessly transmits power to the drive unit of the bucket, the conversion unit transmits the converted AC power to the boom transmission unit, the boom transmission unit transmits the AC power to the arm transmission unit, the arm transmission unit transmits the AC power to the bucket transmission unit, and the boom transmission unit, the arm transmission unit, and the bucket transmission unit are directly connected to an AC voltage bus.

* * * * *